United States Patent
Johnson

[11] Patent Number: 6,152,601
[45] Date of Patent: Nov. 28, 2000

[54] FASTENER TAPE MATERIAL, BAG UTILIZING FASTENER TAPE MATERIAL, AND METHOD OF MANUFACTURE THEREOF

[75] Inventor: James R. Johnson, Chamblee, Ga.

[73] Assignee: Illinois Tool Works Inc., Glenview, Ill.

[21] Appl. No.: 09/133,615

[22] Filed: Aug. 13, 1998

Related U.S. Application Data

[62] Division of application No. 08/899,434, Jul. 24, 1997
[60] Provisional application No. 60/022,353, Jul. 24, 1996, provisional application No. 60/036,186, Jan. 18, 1997, and provisional application No. 60/035,051, Jan. 22, 1997.

[51] Int. Cl.[7] .................................................. B65D 33/22
[52] U.S. Cl. ............................ 383/210; 383/61; 383/63
[58] Field of Search .......................... 383/63, 61, 210; 493/217

[56] References Cited

U.S. PATENT DOCUMENTS

| | | | |
|---|---|---|---|
| 3,355,997 | 12/1967 | Heimos et al. | 493/213 |
| 3,511,746 | 5/1970 | Davies | 383/210 |
| 3,780,781 | 12/1973 | Uramoto | 383/61 |
| 3,948,705 | 4/1976 | Ausnit | 383/63 |
| 4,617,683 | 10/1986 | Christoff | 383/63 |
| 4,655,862 | 4/1987 | Christoff | 383/63 |
| 4,874,257 | 10/1989 | Inagaki | 383/63 |
| 5,077,064 | 12/1991 | Hustad et al. | 383/63 |
| 5,121,997 | 6/1992 | Le Pierre et al. | 383/63 |
| 5,238,306 | 8/1993 | Heintz et al. | 383/61 |
| 5,609,420 | 3/1997 | Palmisano | 383/63 |
| 5,672,009 | 9/1997 | Malin | 383/63 |
| 5,749,658 | 5/1998 | Kettner | 383/61 |
| 5,972,396 | 10/1999 | Jurgovan et al. | 383/63 |

FOREIGN PATENT DOCUMENTS

| | | | |
|---|---|---|---|
| 398731 | 11/1990 | European Pat. Off. | 383/210 |
| 547966 | 12/1991 | European Pat. Off. | 383/61 |

*Primary Examiner*—Stephen P. Garbe
*Attorney, Agent, or Firm*—Pitney, Hardin, Kipp & Szuch LLP

[57] ABSTRACT

Methods, an apparatus and a system in which reclosable bags and components thereof are formed are disclosed. The reclosable bags 2001 are made from base web material that has transversely applied fastener tape segments thereon. The web material is used in a vertical form, fill and seal bag forming method. The method includes the steps of supplying a continuous strip of tape, having male and female fasteners profiler across the web for sealing thereon. In one embodiment a continuous strip of barrier material, and a continuous strip of fastener having first and second interlocked fastener profile strips are positioned on the continuous strip of tape; and secured thereon, the barrier tape is folded to obtain a fold and two opposing barrier tape fastener strip connecting portions; and, the fold is slit to form two separate continuous strips of barrier material strips and two continuous strips of tape. In another embodiment a coating is applied to the tape itself to prevent sealing of the folded slit tape to itself. The resulting tape and fastener are cut 220 and portioned properly on the web by the unique vacuum belt system of the present invention and by the interconnected tape drive, web drive and the connection to the form fill seal machine.

1 Claim, 34 Drawing Sheets

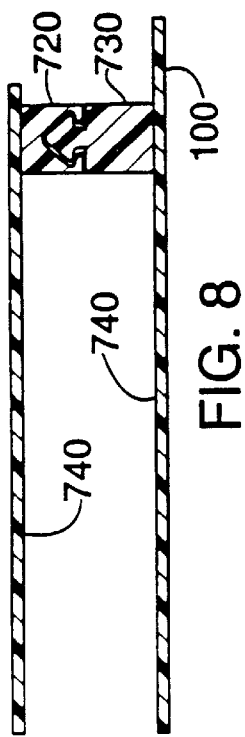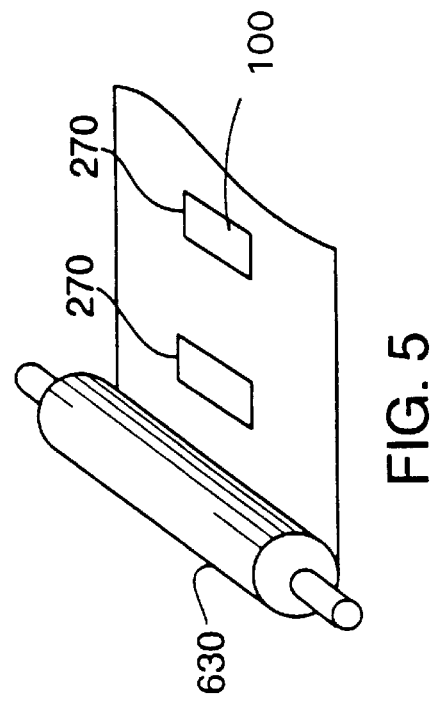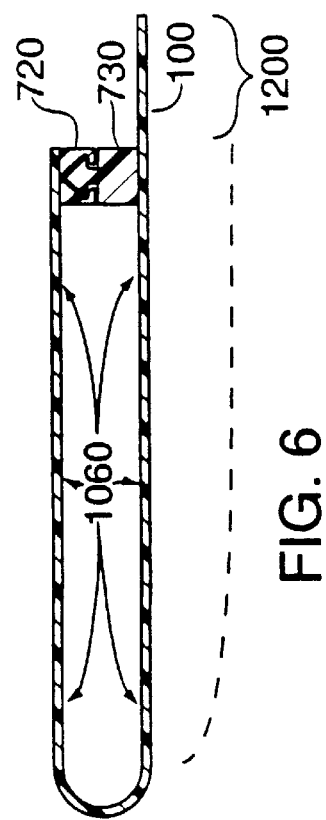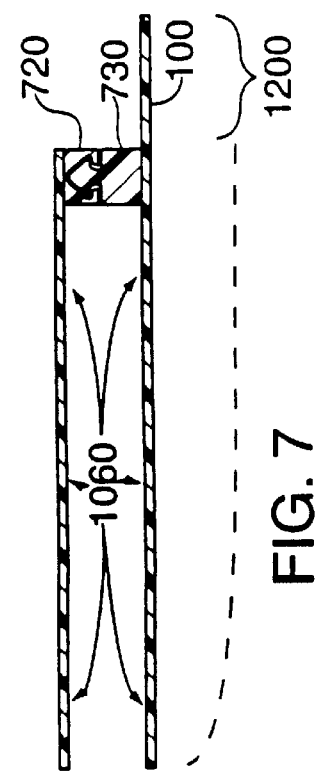

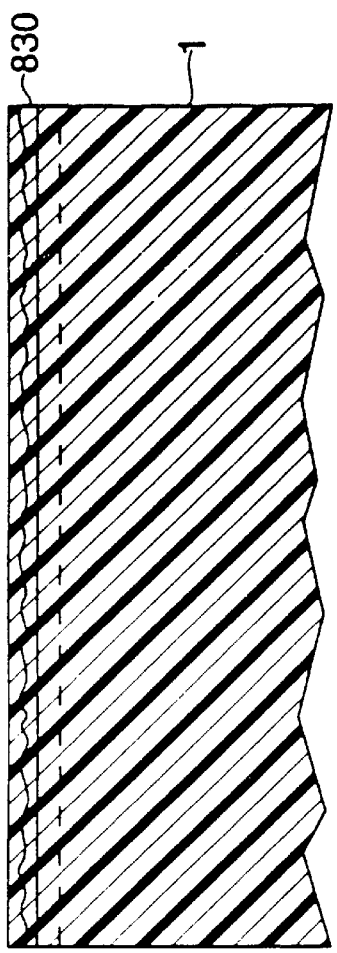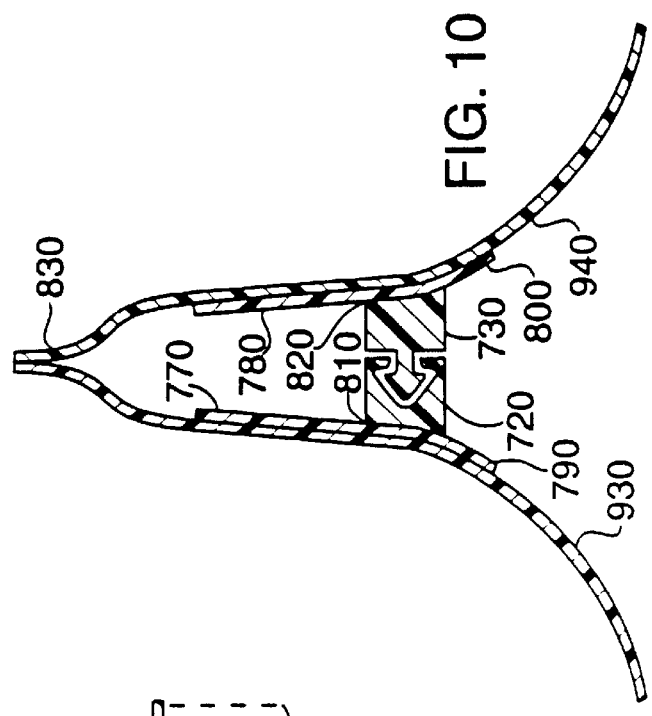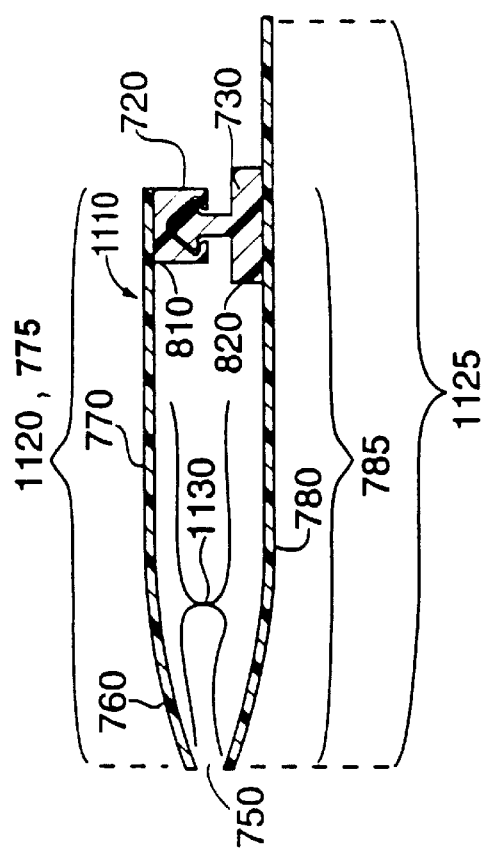

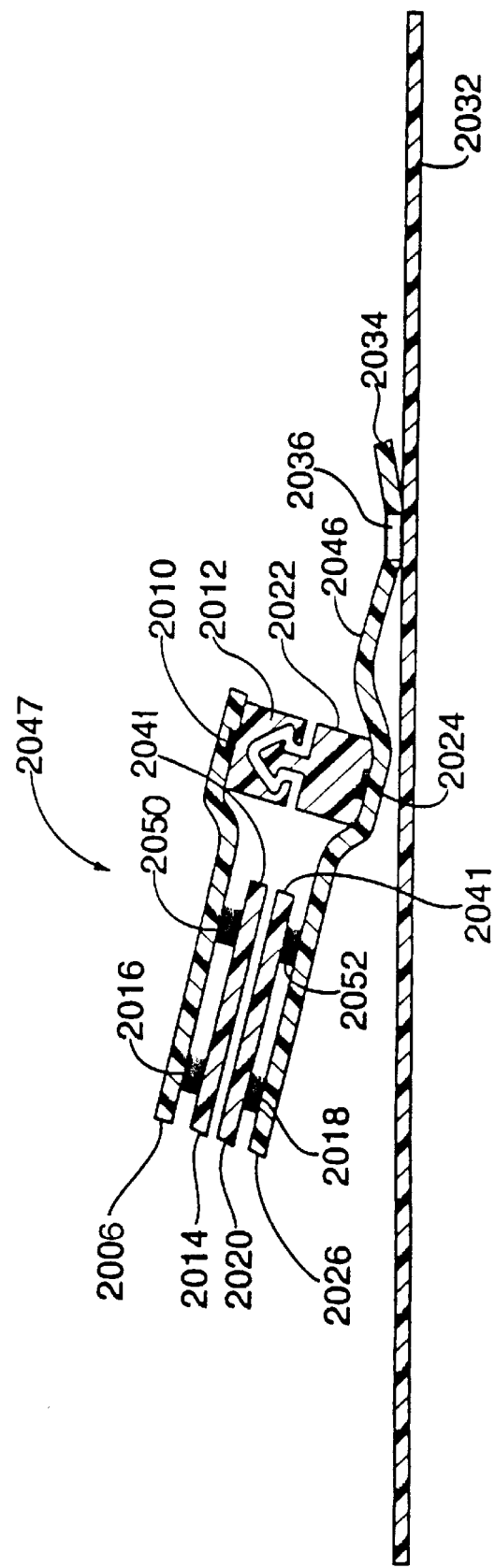

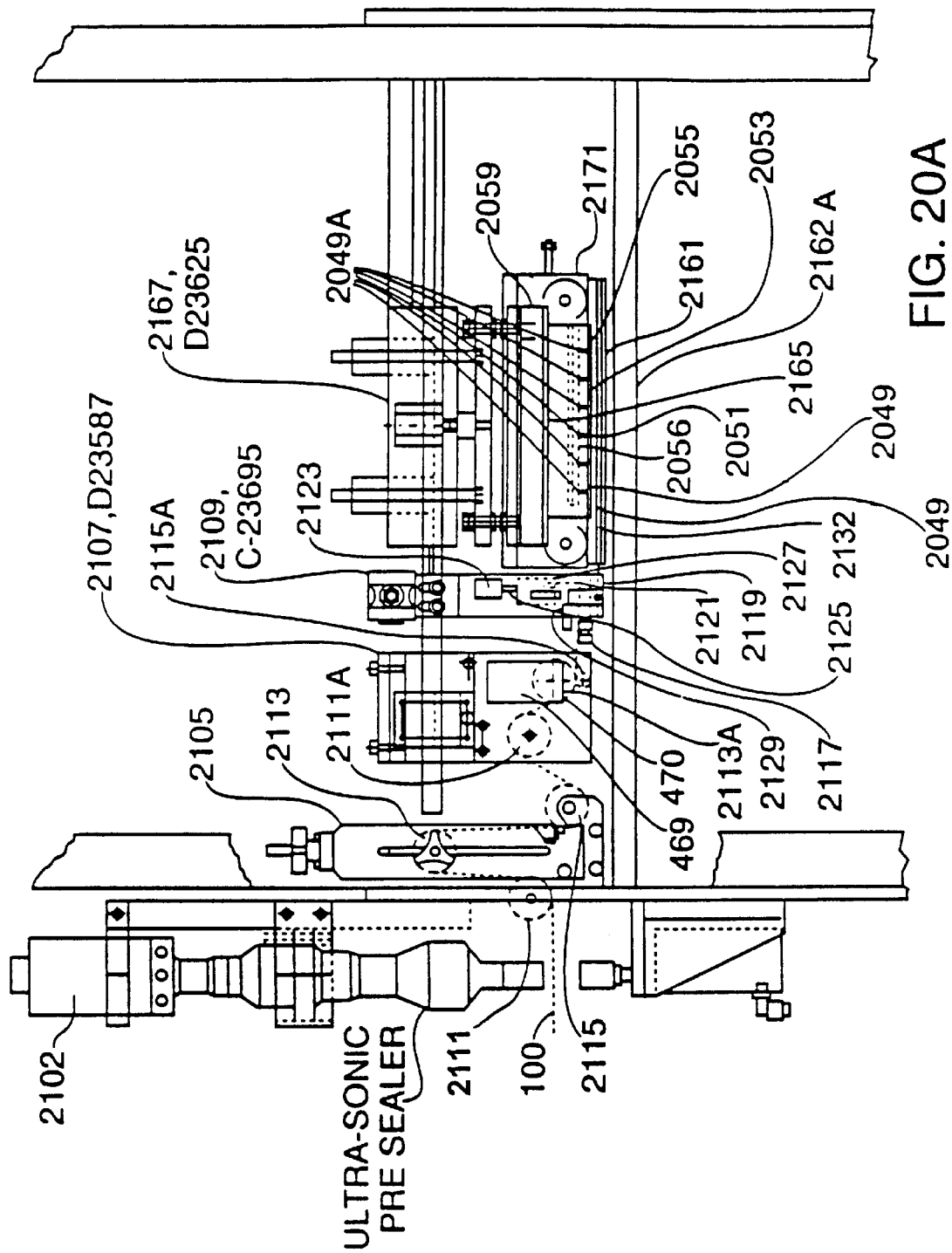

FASTENER TAPE MATERIAL, BAG UTILIZING FASTENER TAPE MATERIAL, AND METHOD OF MANUFACTURE THEREOF

This application is a division of U.S. application Ser. No. 08/899,434, filed Jul. 24, 1997, which claims the benefit of U.S. Provisional Application No. 60/022,353, filed Jul. 24, 1996; U.S. Provisional Application No. 60/036,186, filed Jan. 18, 1997; and U.S. Provisional Application No. 60/035,051, filed Jan. 22, 1997.

BACKGROUND OF THE INVENTION

This invention relates generally to reclosable plastic bags and in particular to tape used in the manufacture of reclosable plastic bags, the web that the bags are made from, methods related to their manufacture, and an apparatus for manufacturing reclosable bags that is more efficient and economical than conventional methods and devices.

While most packaging is done with polyethylene sheeting, or a polyethylene sealant layer if barrier sheeting is used, there are problems of sealing the intended sealant layer of the bag wall to reclosable profiles due to profile thicknesses, or due to the thicknesses of flange material that may be integral with the profile, even if the surfaces to be sealed are both polyethylene and compatible.

There are even more complex problems when the sealant layer of the bag walls is something other than polyethylene, as the inside bag wall layer of oriented polypropylene sealant layer of potato chip bags. Sealing reclosable materials to this wall means using materials that are compatible. This invention gives a practical means to accomplish these results.

U.S. Pat. No. 4,909,017, McMahon discloses the delivery of a pair of interlocked, profiled fasteners transversely across a web of film used in forming a plurality of bags. However, the system of McMahon is non-enabling in that fastener strips cannot be delivered as described therein.

There is no attempt in the written description to describe how the narrow fastener strip can be fed, held and sealed onto the base web. The strip material would be unstable for sealing due to the rib and groove design, which would rock on center. The strip material is naturally curled from extrusion and distorted from being wound onto a spool. The difficulty of feeding this unstable strip cross web, remove curls and twists, stretch straight and hold for heat and pressure application between a seal bar and anvil makes this method chaotic and impractical.

There are at least two other major shortcomings of the McMahon '017 patent. The first shortcoming involves the impossibility of making commercially acceptable seals of the bag walls to the backside of each fastener half in the bagger sealing jaws. The second shortcoming involves the window of registration required to seal the backside of the fastener to a finished bag wall during bagger cross sealing and the inability of known form fill seal and equipment to repeat the bagger film draw with the required accuracy.

Specifically, the McMahon '017 patent describes a pressure bar seal in the bagger sealing jaws that seals the outer bag material precisely to the backside of the fastener profile. Yet, it has been discovered, as described in Applicant's specification, that a pressure bar seal requires a stable and flat surface to properly seal. The irregular shape of the fastener profile makes this impossible. One requires heat, dwell time, and pressure to effect a commercially acceptable seal and due to the irregular shape of the profile, it is impossible to get enough stable pressure to accomplish a commercially acceptable seal. The surface moves and gives unpredictably. If enough heat and pressure are applied for a sufficient dwell time to mash the base of the profile flat enough to seal, the profile hooks are softened and deformed, making it impossible to repeatedly use the completed bag for opening and reclosing.

The McMahon '017 patent has an additional shortcoming related to sealing the seamed side of the bag to the opposite side of the fastener. Based on Applicant's knowledge and experience, this cannot be done to produce a commercially acceptable product. The fact is that no bagger can draw with the accuracy the McMahon '017 patent requires, to place the second seal, in register, on the back side of the fastener profiles.

Another illustrative patent is U.S. Pat. No. 5,461,845 to Yeager. There are at least two definitive shortcomings therein. The first shortcoming relates to the problem of having to open the zipper completely from the front panel of the finished bag. Users of reclosable bags and packaging are accustomed to opening the profiled fastener from the "top" of the package, and not from the front panel of the package. Hence, the user will have to become accustomed to a method with which he may not be familiar or comfortable.

The second shortcoming is more serious, and relates to the requirement of opening the package from the front panel thereof. If the package is to be opened from the front panel, a cut or perforation must be made before the fastener is applied. This cut, or perforation, is generally shaped like an "oval" with opening "tabs" for gaining access to the fastener. Since the fastener, most likely, is not closed at the ends of the fastener, the possibility of contamination exists.

The most expedient and economical way to make the package is to create the cut, or perforation, in one operation, just upstream of the fastener strip application. This operation, in its simplest form, will leave openings for potential contamination to pass through the cut or perforated, front panel opening. To overcome this contamination potential, users of this method add a great deal more cost and complexity to create a sealed, sealable "patch", or some other means of eliminating this contamination risk. The same problem occurs, if the package must be hermetically sealed.

There is also a serious drawback of coextroding a flanged zipper having ribs on the inside of the flanges so that it is unsealable, when heat is applied to each bag wall side. The drawback is that a unitary extruded flanged zipper has a limitation as to thinness of the flanges that can be integrally extruded with reclosable profile. Further, use of co-extruded ribs to make the inside of the flanges not seal together increases the thickness of the flange area even more.

This contrast in thickness of the 4 layers of material which includes the 2 bag walls and the 2 zipper flanges will make it virtually impossible to blend the cross seals through the 4 thickness area and into the 2 thickness area of the bag walls only. For example, if a 3 millimeter: i.e., "mils" wall bag is being made, the coextruded flange with ribs, will be 16 mils per side or 32 mils total. This would require a blending of 38 mils to 6 mils and would most likely eliminate the possibility of closing off openings in the folds of any bag made on a vertical FFS machine.

Thus, there exists a need to solve the problems in the art that are articulated above.

SUMMARY OF THE INVENTION

Accordingly, it is an object of the invention to overcome the shortcomings of the prior art by providing a large skirt (tape) area which a second seal can be easily registered. The skirt (tape) height of the area could be changed, depending upon the bagger design, condition, and the variation in draw height of the bagger.

It is another object of this invention to overcome the shortcomings of the art by using fastener profile mounted on tape in the bag forming process, and requiring that the operations involved sealing two flat, substantially parallel thin surfaces. Thus, there is no irregular surface that is sealed to attach the fastener to the front panel, or to carry the fastener through the bagger and down the form, fill and seal tube or to seal the back-seamed side of the package. It is also an object of the present invention to allow the customer/user of the package to open the package from the top, as he or she is accustomed.

It is an additional object of the invention to treat the inside surface of the skirt (tape) area to prevent area from being sealed together in the process described below, to allow zipper and bag opening from this area.

It is an additional, object of the invention to solve the shortcomings of the art through the use of fastener tape as described below, to provide a thin substantially flat, fastener appendage which is sealed to the bag wall(s) and to treat the inside layers of the fastener opening tabs, above the fastener.

It is a further object of the invention to provide an automatic contamination-free package by sealing the fastener completely inside the package. In this variant, the top seal of the package must be cut off to allow the customer/user to get to the opening tabs of the fastener.

It is a further object of the invention to provide improved control of web dispensing by using driven, dancered unwinding of the base web and indexing of the base web for zipper application positioning. The zipper application includes a servo motor and computerized motor controls.

It is an additional object of the invention to provide unwinding, tensioning guiding and indexing of the fastener tape materials in the attachment thereof to a web, linked to the indexing of web but independent thereof.

It is a further object of the invention to obtain a balance of tensions between the fastener strip and tape material by providing a driven, dancered web for feeding folded and lightly-tensioned tape material to a fastener sealing device.

It is yet a further object of the invention to obtain a flatter, straighter, curl-less fastener tape from the fastener tape operation by more accurately controlling the relative tensions of the webless fastener and the tape material during application of the fastener material to the tape.

It is another object of the present invention to solve these and other problems in the art, and to serve a market that demands hundreds of millions of reclosable plastic bags annually. The objects and features of the present invention, other than those specifically set forth above, will become apparent in the detailed description of the invention set forth below and in the drawings.

The invention also provides a method of making a reclosable bag having a body with top and bottom ends and opposing walls in a vertical, form, fill and seal machine that includes the steps of forming the bag walls from web material having a longitudinal back seal extending between the top and bottom ends of the bag body, and transversely securing across the longitudinal back seal a flange of a flanged, interlocked fastener strip. The flange is substantially wider than the width of the interlocked fastener strip attached to the flange. As such, it is appreciated that the sealer bars do not contact or deform the interlocked fastener strip during the sealing process. It is further appreciated that the method allows for a commercially acceptable seal to be made across the longitudinal back seal while providing greater tolerance for deviations in bagger web draw.

The flange or tape is sized and dimensioned to provide a larger window of registration than that required to seal the backside of a conventional fastener onto a finished bag wall whether it is a back or front panel wall, directly onto the backside of the fastener during bagger cross sealing. The flange or tape is also sized and dimensioned to provide repeatable sealing of the tape or flange to the bag wall during the transverse bagger cross sealing process while allowing for variances and deviations in bagger web draw.

The invention further includes an improved vertical, form, fill and seal process that includes transversely sealing a non-profiled, stable and substantially flat surfaced appendage or flange having a profiled, interlocked, reclosable fastener strip connected thereto across the longitudinally extending back seal of a bag during bagger cross sealing. It is appreciated that the transverse sealing across the non-profiled, stable and substantially flat surfaced appendage permits one to seal the appendage to bag material with an effective heat, dwell time, and pressure to effect a commercially acceptable seal without the surface moving and giving unpredictably. It is also appreciated that greater, pressure and dwell can be applied to mash the shape flat enough to seal, while simultaneously preventing the profiled fastener from softening and deforming making it possible to repeatedly use the completed bag for opening and reclosing.

In a variant, as described above the invention provides a two piece tape or flange comprising a very thin, substantially flat, tape or flange portion connected to the zipper profiles to obtain a commercially acceptable flanged zipper. The very thin, substantially flat, tape or flange portion is preferably construct from web material of about 0.003" in thickness that is very flexible. It is also possible to use tape materials in the range of about 0.003" inches in thickness to as thin as 0.001" in thickness. The preferred loop is a high loop of about 1.25". By using a high loop it is possible to obtain enough stiffness in the combination tape/flange fastener profile assembly to push the assembly at the start of the transverse application process, and then attach the thin, flexible, wide loop quickly to a vacuum belt, so that it can be carried across the base web for positioning. Holding and transporting the flexible loop (or flange if the loop is split open) across the web is readily accomplished using a modest amount of vacuum. A printed barrier can be applied to the inside loop area to make it non-sealable, while adding very little to the thickness of the loop.

The system method, and (tape or flange) assembly described above is extremely versatile. The tape or flange is substantially thin allowing its use with a greater variety of bag walls materials, regardless of the base web thickness. The tape or flange, since it is ribless and thin, blends the cross seals better, from tape plus bag wall thickness to bag wall thickness only, and results in continuous seals, sealed in the bagger sealing jaws.

Further, the assembly described above is constructed to be readily, transversely "pulled" across a web of material, and the assembly method, and system can be used with any appropriate tape base material. As described above the invention described above can be used on laminate bag wall base web material, e.g. snack food bag wall and base web material where a user does not want to change their present structure/bag wall material which would not seal to LDPE material. The preferred non-sealable treatment of the tape or flange is to provide a printed food grade nitro cellulose coating into the loop (flap) area. As such, the invention provides a two-piece fastener profile having each respective profile connected to a loop portion of a tape or flange in which the inside loop portion of the tape or flange is treated to be non-sealable, e.g. has a non-sealing inside surface.

BRIEF DESCRIPTION OF THE DRAWINGS

The present application includes at least one drawing and/or photograph executed in color. Copies of this patent with color drawing(s)/photograph(s) will be provided by the Patent and Trademark Office upon request and payment of the necessary fee.

FIG. 5 is a perspective view of a web of the present invention;

FIG. 6 is a side cross sectional view of a tape of the present invention;

FIG. 7 is a side cross sectional view of a flange of the fastener of the present invention;

FIG. 8 is a side cross sectional view of a variant of a flange of the present invention of FIG. 7;

FIG. 9 is a side cross sectional view of a flange of the present invention;

FIG. 10 is a side cross sectional view of an assembled bag of the present invention;

FIG. 11 is a front plan view of the bag of FIG. 10;

FIG. 18 is a side cross sectional view of a portion of the web having fastener tape segments of FIG. 17;

FIG. 20-A is a side view, partially broken away, of the fastener tape dispensing assembly of the present invention;

FIG. 20-B is a side view, partially broken away, of the fastener tape dispensing assembly of FIG. 20.

DETAILED DESCRIPTION OF THE INVENTION

Figure 1:
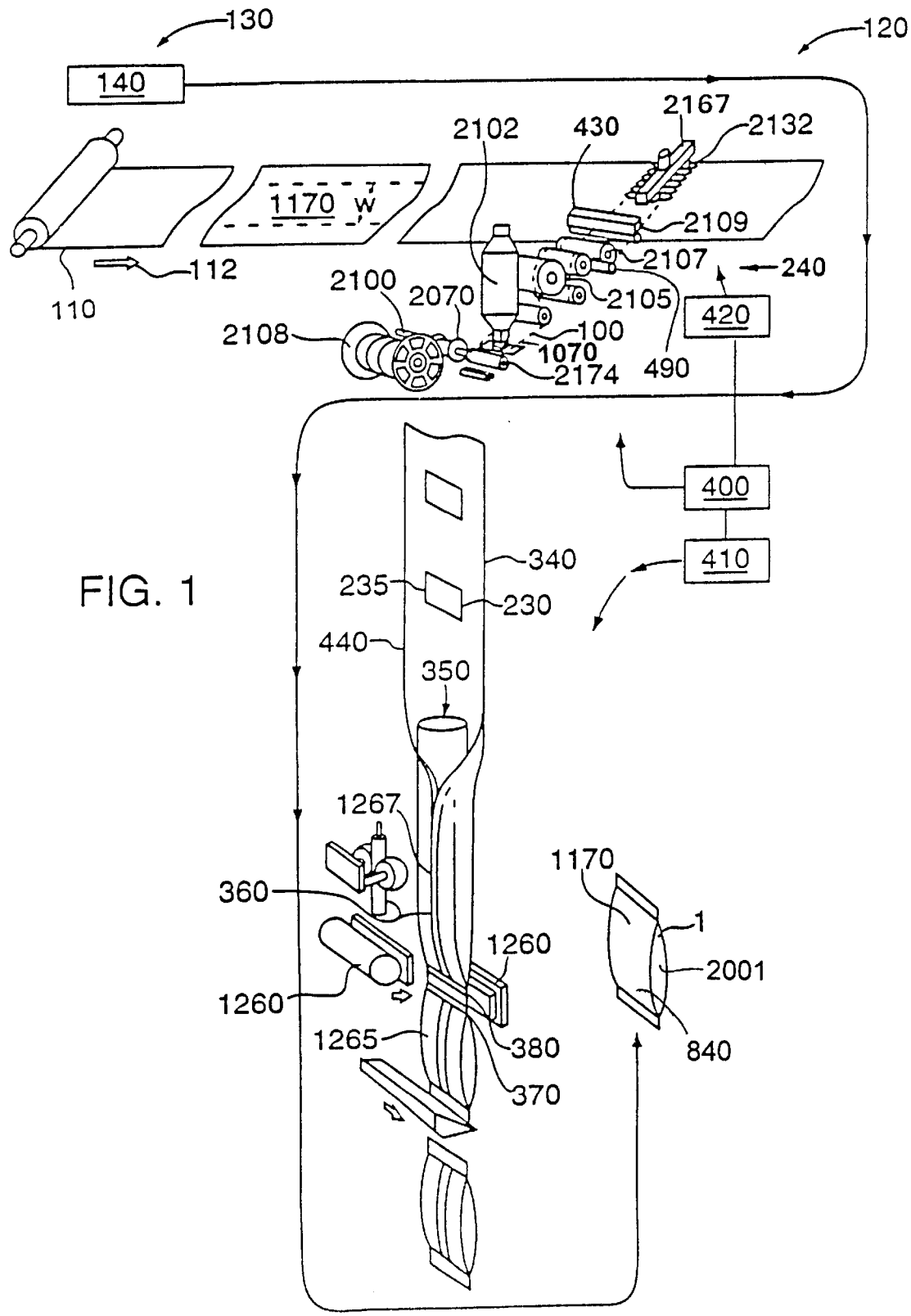
FIG. 1 is a schematic representation of the system for performing the processes of the present invention.

FIG. 1 is a schematic representation of system 120 of the present invention for sealing tape 100 to web 110. The proper feeding, locating and sealing tape 100 at predetermined locations on base web 110 are important aspects of system 120. System 120 is reliable and capable of repeatedly performing steps with high throughput and with low cycle times. The manner in which tape 100 is fed, and positioned for sealing onto base web 110 is critical to achieving accurate secure sealing of tape 100 to web 110. To this end, base web 110 is indexed at indexing station 130, via servo motor 140. Servo motor 140 has control over acceleration, speed and deceleration of web 110.

Figure 4:
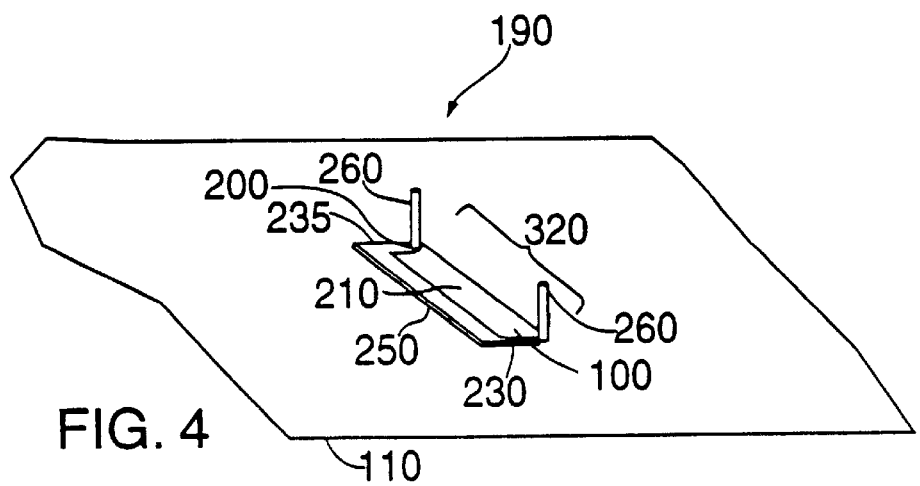
FIG. 4 is a perspective view of the tape of FIG. 6 being ultrasonically staked to the web.

As shown in FIG. 4, in an alternative embodiment, the movement of web 110 in the direction of the arrow 112 in FIG. 1 creates air movement over web 110 affecting anything that is attempted to be passed over it, such as tape 100.

The tendency is to pull the leading edge of tape 100 in the direction of the movement of base web 110. Tape 100, which is generally about 1" to 2¾" wide, effectively floats on current of air not shown. At the end of the tape delivery 190, tape 100 is in a stretched position 320 across web 110, assuring squareness for positioning onto base web 110. By "pinning" or staking tape 100 at a stretched corner, then pinning or staking it at a corner at the opposite end of tape 100, sealing can be accomplished with tape 100 square and in register with base web 110. Seat 280 is transverse to web 110 and parallel to the fastener that is attached to tape 100.

In the alternative embodiment, it has been determined that the following sequence of steps rapidly and accurately feeds, positions and seals tape 100 onto web 110:

1. Driving tape 110 forward using a set of zipper grooved rubber nip rollers 150 connected to stepping motor 160 at stepping station 170.
2. Carrying tape 110 transversely across web 110 with a curtain or stream 180 of air directed above and below tape 100 material from air supply 105, so as to eliminate the influence of base web 110, which is moving concurrently beneath tape 100 and at a right angle thereto.
3. Stopping the air current or curtain of air 180 at delivery end station 190, and concurrently pinning loop side corner 200 of tape 110 to base web 110 (FIG. 1) before the tape 110 is chopped or cutoff at cutting station 210.
4. Pinning the tape 100 material at opposite end 230 (FIG. 4) at cut 220 is being made and, holding the tape 100 material in position to be sealed at positioning station 240 with pinning devices 260.
5. Sealing single lip 250 to base web 110 with a sealing device. (e.g. fastener segment attachment assembly 2101), while pinning deices 260 continue to hold severed tape piece 270 (FIGS. 1 and 4) in position, substantially square with base web 110.
6. Continuing to hold the tape with pinning devices 260 while the seal bar lifts away from the sealing position, effectively allowing the sealing bar to strip away from the seal.
7. Releasing pinning devices 260 (Pinning devices 260 include pneumatically operated rubber boots 310, which are generally about 1" square).

It has been determined that the following sequence of steps rapidly and accurately feeds, locates, cuts and seals tape 100 onto web 110.

1. Controlled by the level of take up dancer arm 520, a signal to index base web 110 and index tape 100 is given.
2. A servomotor 469 drives the tape 100 forward via the nip drive 470 of Tape Drive Assembly D-23587. (2107)
3. The leading edge of the tape 100 is driven into the vacuum belt 2132 in Vacuum Drive Assembly D-23625 (2167). Vacuum openings 2049A in the belt 2132 attach to the skirt area above the zipper 980 tape 100. The Vacuum belt 2132 is driven slightly faster than nip drive 470 roller surfaces 2113–17 and carries the leading edge of the tape 100 to its farthermost position in a stretched manner.
4. After driving the tape 100 the distance desired, the Tape Cutter Assembly C-23695 (2109) is activated to clamp and cut tape 100.
5. As the cutter 2109 clears to return to its uppermost position, the leading edge of the next piece of tape 100 is lifted clear of the cutting slot 2129A to avoid a potential jam on the next feed cycle and so as to be aimed properly for transference to the vacuum belt 2132. Concurrently the cutting ledge moves clear to allow the trailing edge of the tape piece just cut to lay flat for sealing.
6. The tape 100 is sealed to the base web 110 via the sealing bar which is part of Assembly D-23625. (2167) The sealing bar 2159 clears and the cycle is ready to be repeated. The trailing edge of the piece of tape 100 just attached to the base web 110 does not interfere with the lifted leading edge of the tape on next feed cycle due to the leading edge feeding over the trailing edge being pulled away in a transverse direction.
7. Vacuum remains on and seal bond strength of tape 100 to base web 110 allows separation of the tape skirt (flange) 1070 from vacuum belt 2132 when the base web 2032, 2154 indexes. This allows vacuum belt 2132 holding strength to remain constant continuously and prevents time delays to build up vacuum strength after being shut down.

The invention also provides an apparatus 1140 and method for forming and driving web 340 (web 110 having tape 100 sealed thereto) downwardly along the outside of tube 350 (which is part of a vertical form, fill and seal machine), making back seal 360 and making cross seals 370, 380. Each end 230, 235 of the severed tape piece 270 must be sealed in some manner, or the severed tape piece 270 will, simply, separate at its first opening and realignment will be very difficult. To solve this problem, the ends 230, 235 of our zipper tape piece are "staked" ultrasonically.

The invention further provides a device 400 for coordinating bagger 410 and tape applicator 420. It is important to coordinate the operations of bagger 410 and the operations of tape applicator 420, because uniform web tension must be maintained between these operations, or web tracking will be lost.

Figure 2:
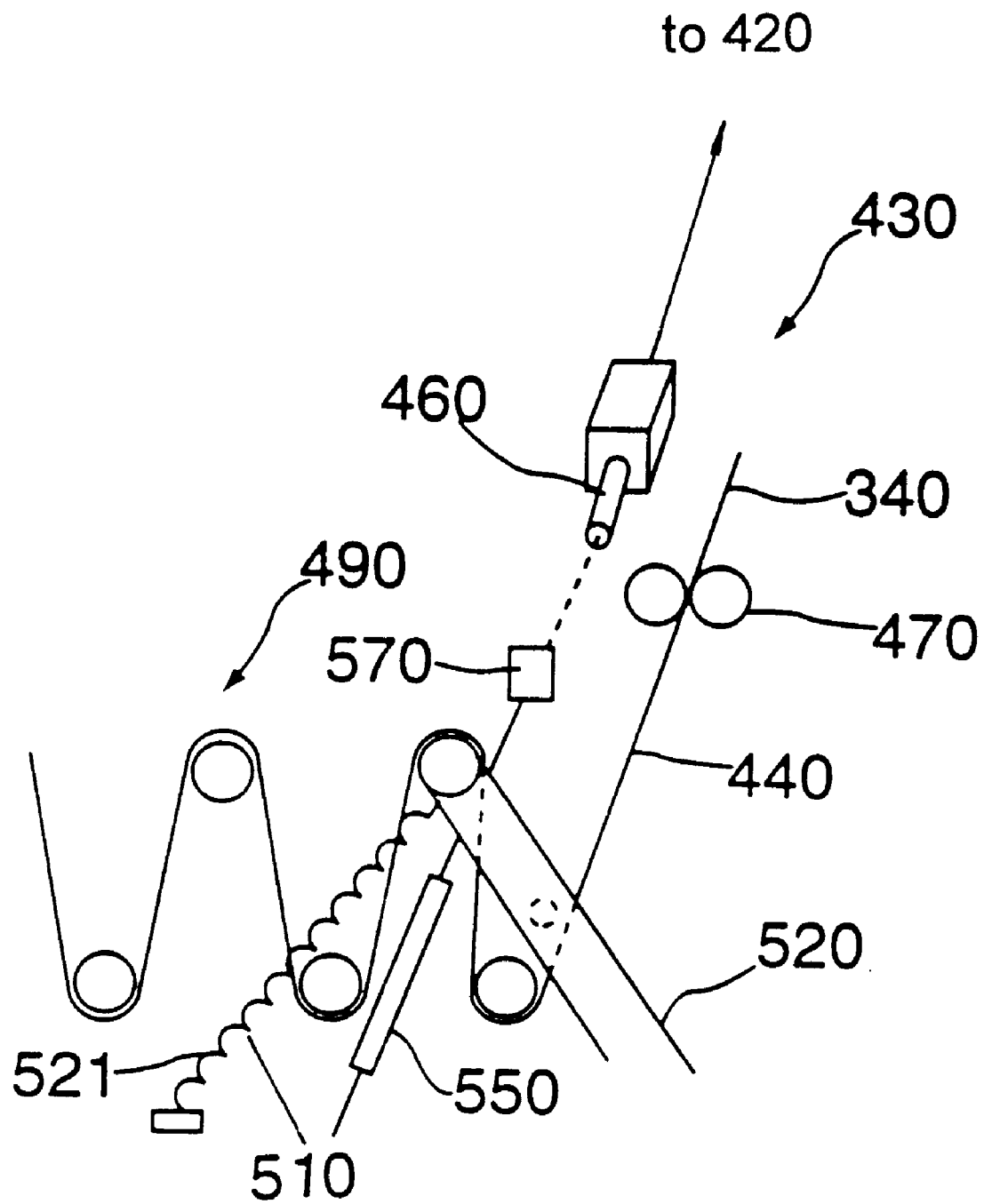
FIG. 2 a schematic representation of a sub-assembly of an apparatus used in the system of FIG. 1.
Figure 29:
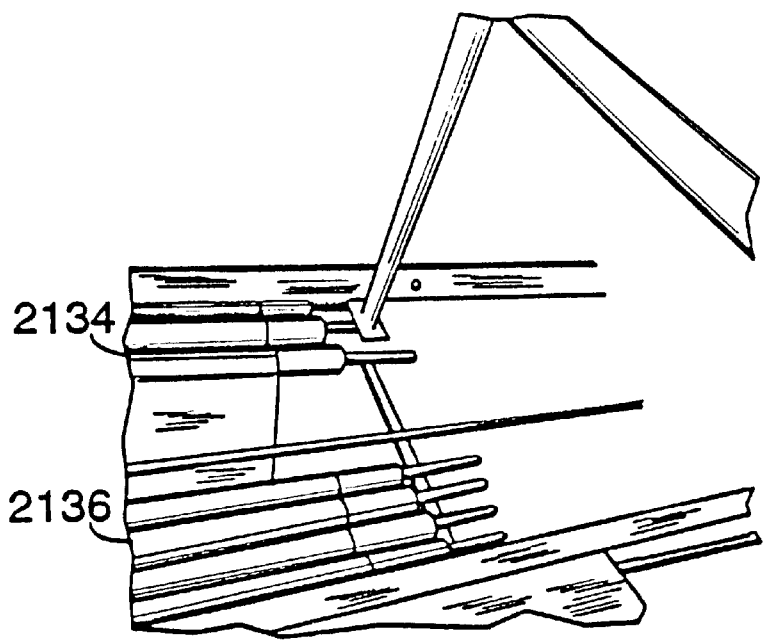
FIG. 29 is a side perspective view of two sets of dancer rollers through which the web having fastener tape segments of FIG. 17 is fed through the present invention.
Figure 30:
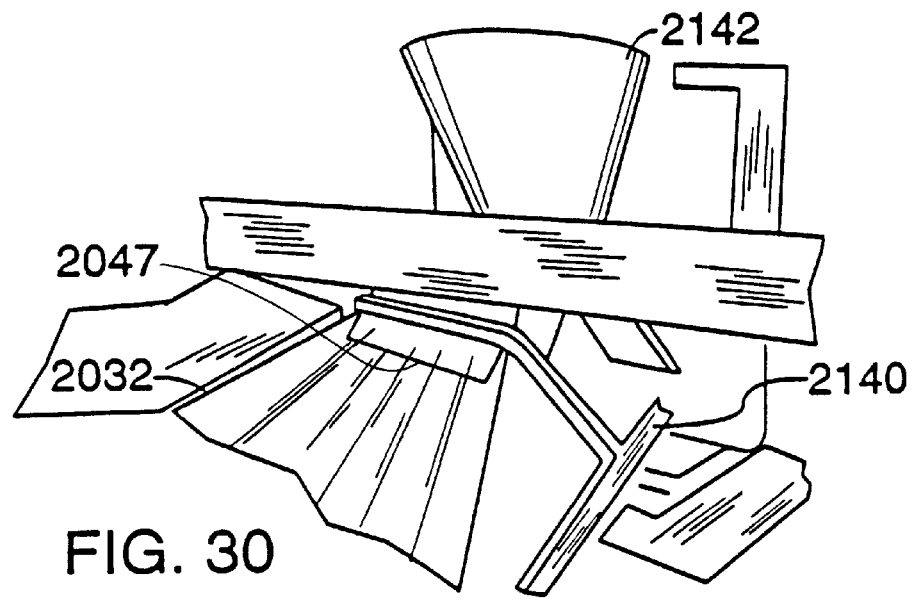
FIG. 30 is a perspective view of the web having fastener tape segments of FIG. 17 as it moves over a forming collar of a form fill seal machine.
Figure 31:
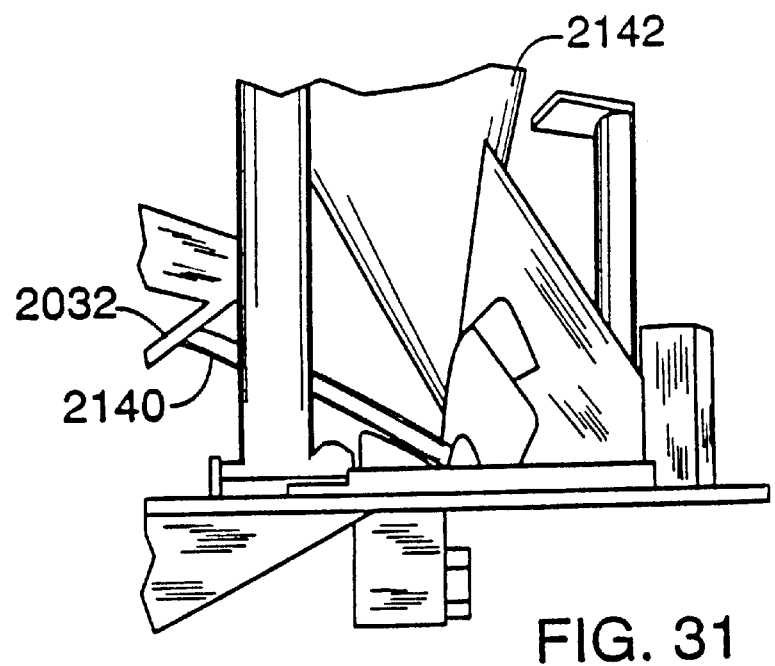
FIG. 31 is a side perspective view of the forming collar of FIG. 30.

As partially illustrated in FIG. 1 and 2, assembly 430 is responsive to device 400 in one variant and delivers uniformly tensioned web 440 to bagger 410 and takes up the material being fed by the tape applicator 420, while simultaneously maintaining good tension all the while. The three sections of assembly 430 are a spring loaded three loop dancer 490 with a photo sensor 460 which reads the position of the dancer 490 and, when ready, starts the cycle of tape 100 application; a nip drive 470, for feeding the tape 100 (FIG. 29) and, a second three loop dancer 2136 (as shown in FIG. 29) between the nip drive 470 and the bagger 410 (FIG. 1) which controls the nip drive 470.

Indexing of the bagger 410 and indexing of the tape applicator 420 are independent. Bagger 410 indexes, causing the three loop dancer 490 to rise. A proximity switch (not shown) and a cam causes nip drive 470 to pull material 440, thereby lowering arm 520 on the dancer 490. When additional material 440 is pulled through the nip 470, the upstream dancer arm 520 rises causing coils 510 in springs 521 to stretch, under tension. Photo sensor 460 then sees flag 570 on arm 550 of the dancer 490, which causes tape applicator 420 to index. The coils 521 under tension pull arm 520 down to receive material 340 being indexed into three loop assembly 490. The process is then continually repeated. As a light a tension as possible is used on the spring so that little resistance to the movement of the tape is applied, thereby reducing the tension on the tape and resistance to the inertia of the tape moving forward. As a result positioning of the tape is more accurate throughout the system.

Figure 3:
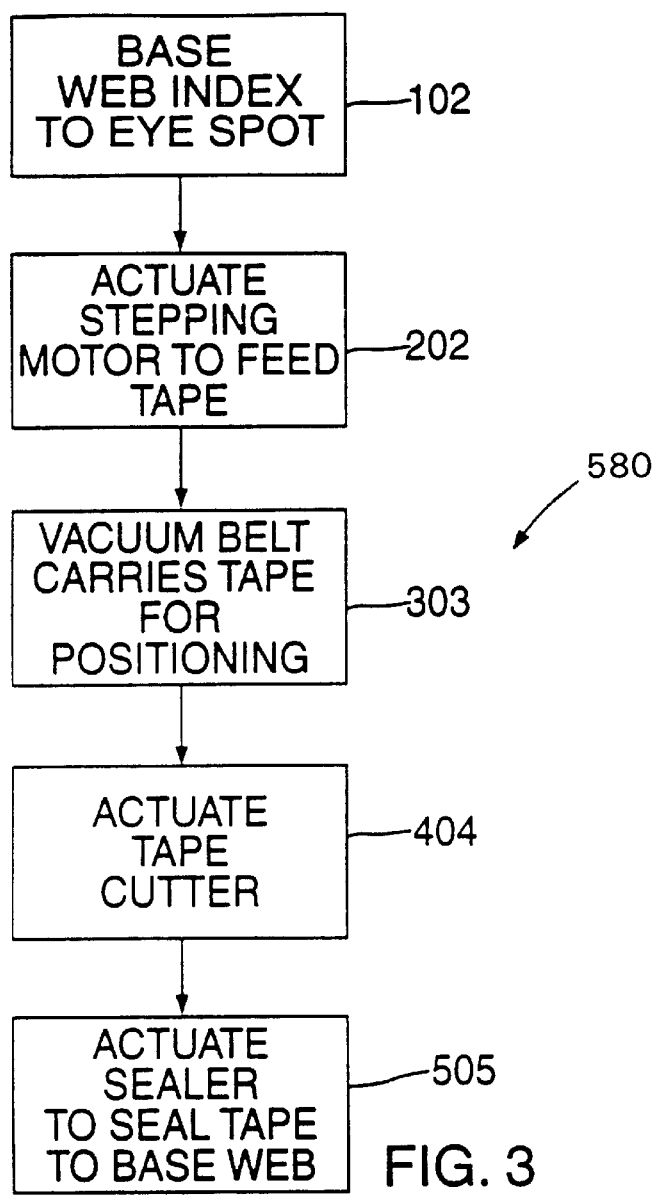
FIG. 3 is a flow chart of a routine of the present invention.

FIG. 3 illustrates a tape applicator program 580 that executes the following steps of the routine: 102—Base web 110 indexes to eye spot 590, via servo motor 140; 202—Tape 100 is fed, via stepping motor 303—vacuum belt 2132 carries tape 100 for positioning 404—Tape 100 is cut, and sealed to base web 2032, 2154. 505—Actuate seal 280 to seal tape 100 to base web 110.

Another aspect of the invention provides for an attachment of tape applicator 420 to a winder 600 (not shown). This allows bagger 410 to function with pre-applied tape. There exists substantial demand for zippered roll stock 630 with tape 100 already sealed onto base web 2154 to be run on separate baggers. This approach to zippered packaging is not a replacement for in-line capability, but can be used as another option.

System 120 described above optionally feeds a winder (not shown), as well as bagger 410 with, practically, no modifications. In these cases, the packer or the converter could be the user of the equipment. This approach allows any converter to provide a customer-packer with preapplied zippered roll stock 630 enabling the converter to obtain base web business he would not ordinarily get. The packer runs preapplied zippered roll stock 630 for multiple baggers without having to provide tape applicator 420.

The invention also provides for methods of treating the internal loop or flap area 1060 of tape 100 to create a non-sealing characteristic thereof as illustrated in FIGS. 6 and 7. The inside surface of the loop or flap area 1060 of the tape 100 material is treated to make it not seal in bagger 410 during the jaw sealing process 1260. In one variant, the inside loop area 1060 is treated to be non-sealable or, in another variant, the inside flap areas 1060 are treated to be non-sealable.

There are several ways in which this is accomplished, including electronic surface (corona-style) treatment, non-sealable printing materials application, laminated, or sealed barrier (non-sealable) strip application onto tape 100 material between zipper halves, 720, 730 and insertion of barrier (non-sealable) strip 740 into loop (flap) area 1060 (FIG. 8).

In one variant, as seen in FIG. 9, the invention includes frangible opening 750, used when the product packaged does not require hermetic seals, such as IQF (instant quick freeze) vegetables and/or fruits. For items not requiring hermetic seals, such as IQF vegetables, where holes are punched to get air out of the bag and release $CO_2$, frangible opening 750 is desirable as opposed to cutting a top seal 830 off with scissors.

As illustrated in FIGS. 9–11, opening is created during tape 100 manufacturing. Top end 760 is slit open during manufacturing. The tape material 100 is constructed from a single-layer of polyethylene with additives such as ethylene vinyl acetate to facilitate sealing. The application of tape 100 results in a finished package 1 as depicted in FIG. 10. The perforating operation to create frangible opening 750 is incorporated into the sealing jaws 1260 of the bagger 410. which also seals the cross web tape loop 880 the top seal 830 and seal bottom seal (not shown) of the bag 1.

As illustrated in FIGS. 9–13, flanges 770, 780 having fastener profiles 720, 730 thereon are sealed to the inside walls 810, 820. Flanges 770, 780 are sealed to walls 930, 940 below top seal 830 at seals 790, 800. Frangible opening 750 is disposed below top seal 830 and above flange 780 (FIG. 10).

The invention further includes a process to make preapplied zippered tape roll stock 630 (FIG. 5). The tape 100 material is optionally applied in-line with the bagger operation. Preapplied zippered roll stock 630 is also provided by adding a winder to the tape applicator 420 system 120.

Figure 12:
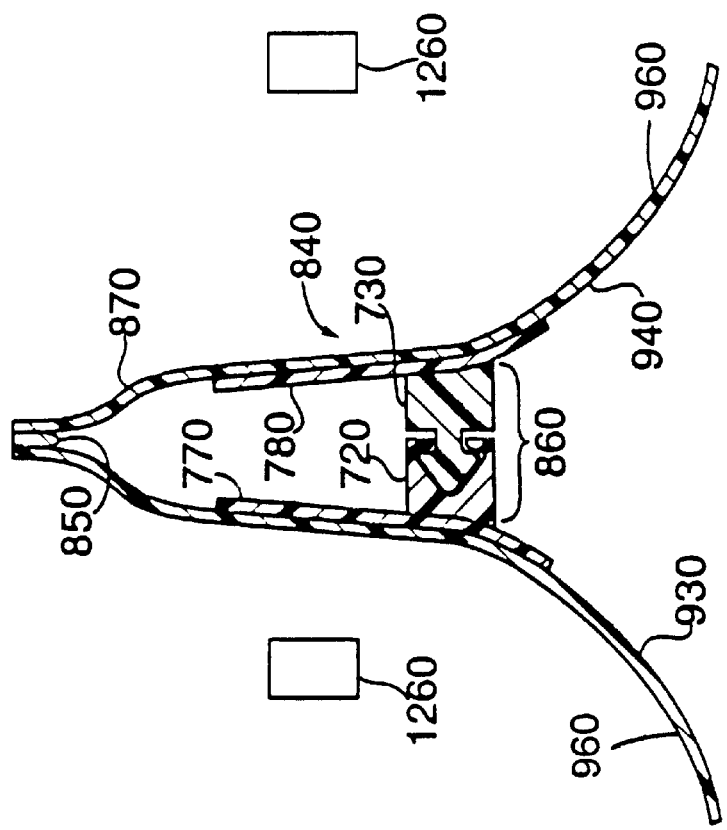
FIG. 12 is a side cross sectional view of a variant of the bag of the invention and sealing bars.

The invention also includes variants for "chip" industry applications. The invention includes an "easy opening" feature for plastic bags. As shown in FIG. 12, chip bag 840 carries very thin sealant layer 850, commonly about 2/10 of a millimeter in thickness. Chip bag 840 includes a reclosable strip 860 just below separable opening portion 870. Separation of the walls of opening portion 870 exposes reclosable opening flanges 770, 780, to the environment if the tape loop 760 (FIG. 9) is slit apart during its manufacture. FIG. 12 also illustrates the location of sealing bars 1260. Sealing bars 1260 seal at least a flat, unprofiled portion of flanges 770, 780 to the bag 840 walls.

In a preferred embodiment, tape loop 880 is slit open during manufacturing. Inside surfaces 890, 900 on flanges 770, 780 (FIG. 13) are treated to be unsealable.

Figure 13:
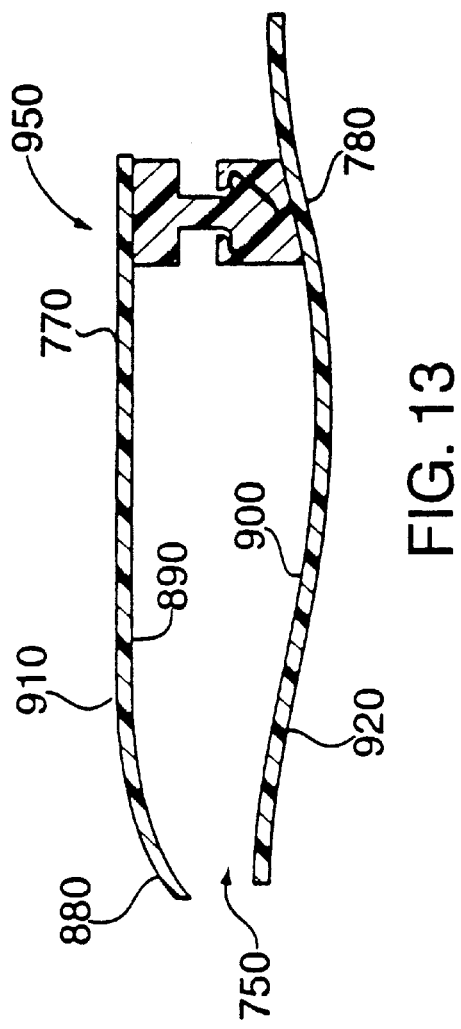
FIG. 13 is a side cross sectional view of a flange of the invention.

Chip bag 840 is manufactured using the following steps: Outside surfaces 910, 920 on flanges 770, 780 include laminate surface sealant compatible with chip bag inside bag surfaces 930, 940 (FIG. 13).

As depicted in FIG. 10, outside surfaces 910, 920 of tape assembly 950 are sealed to chip bag inside wall surfaces 930, 940, respectively. Profiled reclosable strip 860 (FIG. 12) having zipper halves 720, 730 are between flanges 770, 780 in an interlocked arrangement. Top seal 830 FIG. 10 is formed from material used to make easy open chip bag 840 seals (FIG. 12). Bottomseal (not shown) is formed concurrently.

Figure 14:
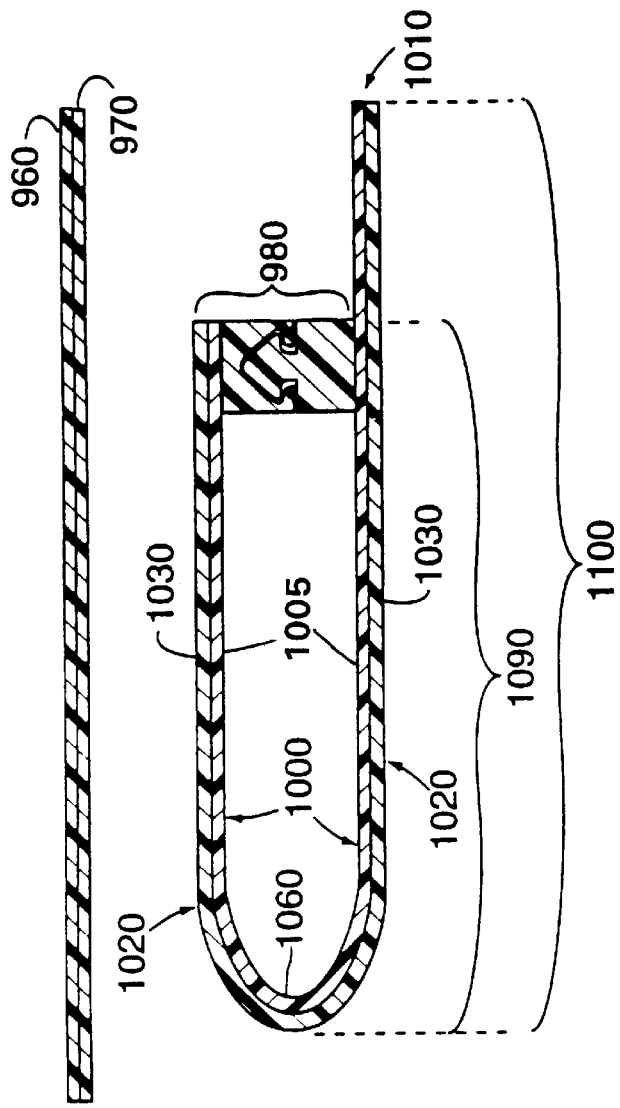
FIG. 14 is a side cross sectional view of the bag material and a flange of the invention.
Figure 15:
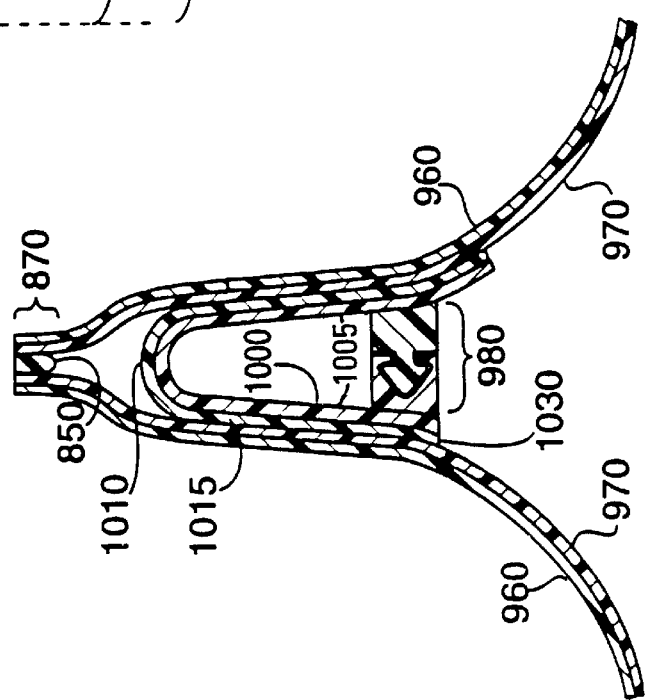
FIG. 15 is a side cross sectional view of a bag of the invention having the tape of FIG. 14.

In the case where packaging material 960, e.g. web stock, has a "different" sealant layer 970 from zipper 980, a coextruded or laminate, tape material 1010 is applied to material 960 (FIGS. 14–15). The fastener side 1005 contains compatible LDPE (low density polyethylene) surface 1000 and the opposite side 1020 is layered with material 1030 that is compatible with the sealant layer 970 of the packaging material 960, such as a potato chip bag 840. Opposite side 1020 is compatible with sealant layer 970 of packaging material 960. Inside surface 1000 is constructed easy sealing to zipper 980. The inside loop area 1060 is treated after zipper 980 is sealed in and cannot be sealed to itself. The outside surface 1030 remains sealable and compatible with the inside surface of packages to effect the desired seal to the package. "Cut here" instructions or other indicia are provided so that the user can expose fastener 980 upon severance along the indicated lines.

In yet another aspect, the invention provides an apparatus to make reclosable tape 1010 (FIG. 14) or flange zipper material 950 (FIG. 13) and wind it into rolls. In one variant, tape 1010 has tape portion 1090 of about ¾" of an inch in length and tape portion 1100 about 1¼" in length is treated to be nonsealable. Tape 1010 is formed from about 3 millimeter stock. In another variant, flange 1110 is manufactured (FIG. 9). Flange 1110 has flange portion 1120 which is about ¾" in length, and flange portion 1125 that is about 1¼" in length. The inside high flange area portion 1130 is treated to be non-sealable. Either tape 1010 or flange 1110 are affixed to fastener profiles and processed as described herein.

As shown in FIG. 1 Apparatus 420 is provided, for indexing sealing tape 100 or flange 1110 to web 110. Apparatus 420 is located behind (or upstream) of form, fill, seal bagger 410. Apparatus 420 unwinds reclosable tape 100 or flange material 1110, indexes, punch holes, and indexes tape 100 again to a location centered above the backside of the intended front panel 1170 of base web material 2154 (cross web) and cuts tape 100 or flange 1110 to a length that is just shy of the width W of front panel 1170 of the intended bag 1 (FIG. 1).

Concurrent with the steps described above, the apparatus feeds (indexes) base web 110 to a position that allows registration of the tape 100 or flange 1110 to just below the intended top portion 1090 FIG. 14 of the finished bag 1. The next step of the method involves sealing as much of the lower flange area 1200 (FIGS. 6 and 7) and the side of the loop 1202 adjacent to the inside surface of the front panel area 1170 to the inside surface of web 110 as is practical. Step three of the method is to provide web 110, now called web 340 to bagger 410. In bagger 410, in addition to making the normal cross sealing and cutting operations, the sealing bars 2159 are modified to seal the opposite side of the loop (or flange) areas 770, (optionally 780), to bag wall 2004 and 2028 having longitudinal seal 1267 thereon (FIG. 1). It is appreciated that the width of tape 1010 or flange 770 permits wall sections 775 and 785 to be sealed to front panel 1170 and back panel 1265 of bag 1 relatively effortlessly, since substantially smooth, parallel, and unprofiled wall sections 775 and 785, and front panel 1170 and back panel 1265 are sealed together as illustrated in FIG. 16 utilizing sealing means 1260.

As illustrated in FIGS. 14 and 15, the invention includes a tape 1010 for attachment to a web. The tape 1010 includes a zipper compatible inside portion 1000 for connection of zipper 980 to the zipper compatible, inside portion 1000, and an outside portion 1030 compatible with sealant layer 970 of packaging material 960 for connection of outside portion 1030 to sealant layer 970. In one variant the zipper compatible inside portion 1000 and the outside portion 1030 are incompatible. The zipper compatible inside portion 1000 is compatible with low density polyethylene compatible. The inside loop surface 1060 is treated so as to be incompatible, i.e. virtually non-sealable during the sealing process.

In a variant, a simplified method of manufacturing the tape 1010 described above is provided that includes the step of coextruding a first base tape material to obtain zipper compatible inside surface portion 1000 and a second base tape material to obtain outside surface portion 1030. Optionally, the method includes the step of fusing the zipper compatible inside portion 1000 to the outside portion 1030 to obtain a laminate structure (FIG. 14). As shown in FIG. 5, the invention includes a web 440 for making reclosable bags 2001 comprising the tape 1010 on flange described hereto.

Figure 16:
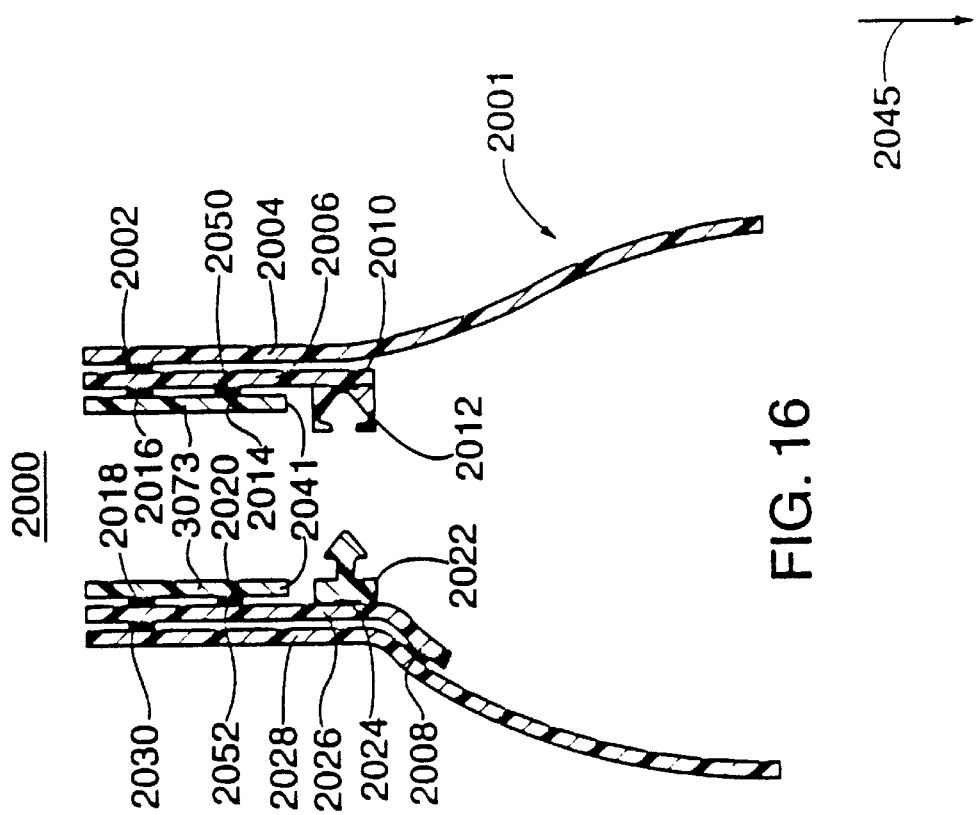
FIG. 16 is an exploded side cross sectional view of an upper portion of a bag of the present invention having a fastener tape connected thereto in which the fastener is in an open position.
Figure 19:
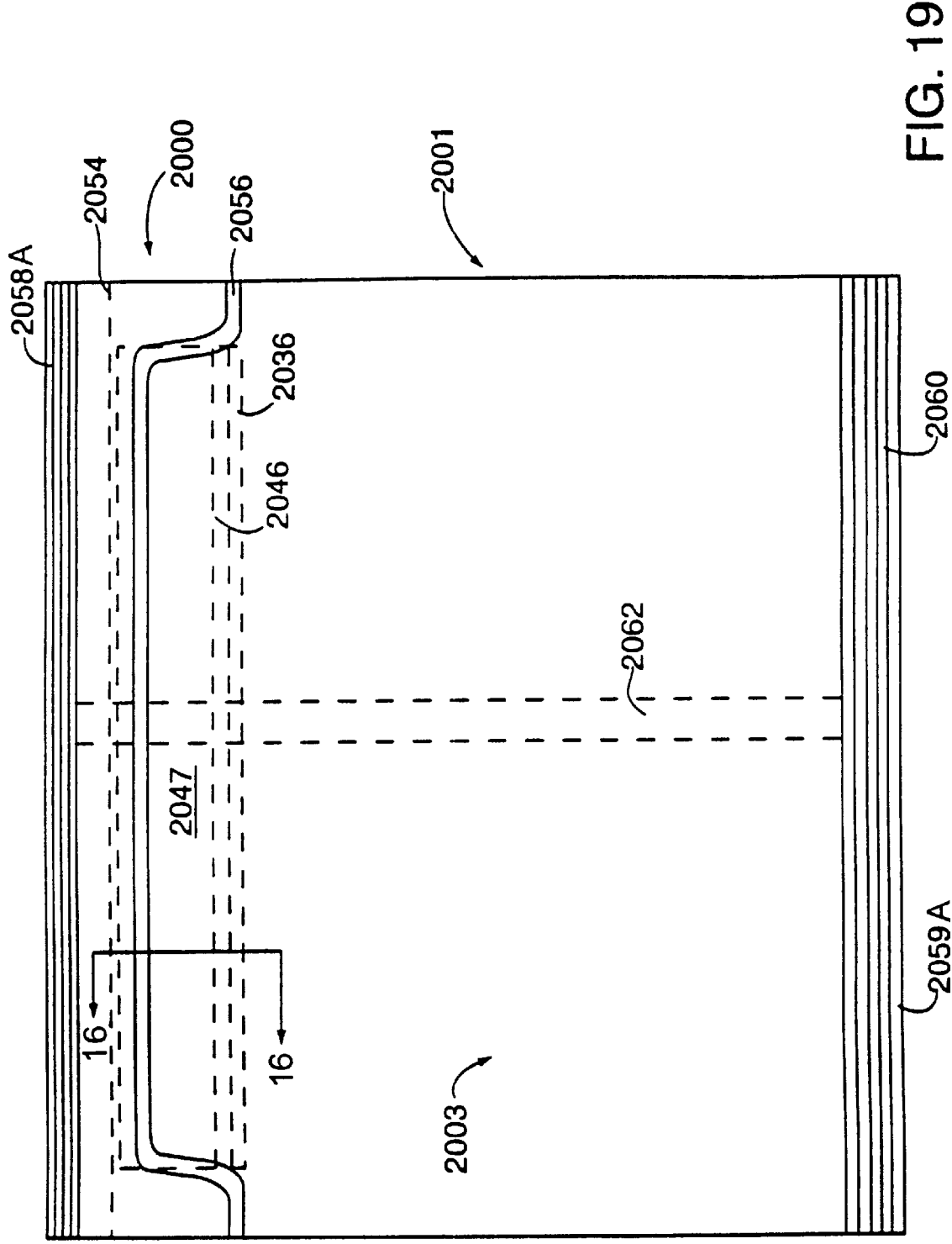
FIG. 19 is a top plan view of the bag including the portion of the bag shown in FIG. 16.

FIG. 16 illustrates an exploded cross section of a portion of reclosable bag 2001 of FIG. 19. Reclosable bag 2001 has a bag body 2003 with bag top end 2000 (FIGS. 16 and 19) and bottom end 2059. Bag 2001 has bottom seal 2060 and back seal 2062, and confronting bag walls 2004, 2028. Reclosable bag 2001 includes fastener tape segment 2047 (FIGS. 16–19) sealed to confronting bag walls 2004, 2028 at seals 2002, 2008, and 2030 in the finished bag 2001. Reclosable bag 2001 optionally includes indicia 2054 indicating where bag 2001 should be cut to provide a user access to interlocked fastener strip assembly 2048. It is appreciated that bag 2001 can be used in many applications including, but not limited to, snack bag applications.

Fastener tape segment (2047) has an interlocked fastener strip assembly 2048 including fastener profile strips 2012 and 2022. Strips 2012 and 2022 are not sealed to confronting bag walls 2004 and 2028. Fastener strip 2012 is sealed to film strip 2006 at continuous seal 2010, and complimentary strip 2022 is sealed to film strip 2026 at continuous seal 2024. Film strip 2006 is sealed to bag wall 2004 at continuous seal 2002, and film strip 2026 is sealed to bag wall 2028 at seals continuous seals 2008, and 2030. Barrier material strips 2014, 2020 are interposed between film strips 2006, 2026. It is appreciated that, as shown in FIG. 16, fastener 2012 is sealed to wall 2004 only at seal 2002 and sealed to strip 2026 at seals 2038, 2044. Thus, a portion of strip 2006 and fastener 2012 are free to move relative to wall 2004. Barrier material strip 2014 is sealed to film strip 2006 at seals 2016, 2050. Barrier material strip 2020 is sealed to film strip 2026 at continuous seals 2018 and 2052. Barrier material strips 2014, 2020 are made from material that is not capable of sealing to itself at temperatures at which film strips 2006, 2026 would seal to bag walls 2004 and 2028. It is appreciated that seals 2002, 2008, 2010, 2016, 2018, 2024, 2030 can be made by conventional methods known in the art.

Figure 28:
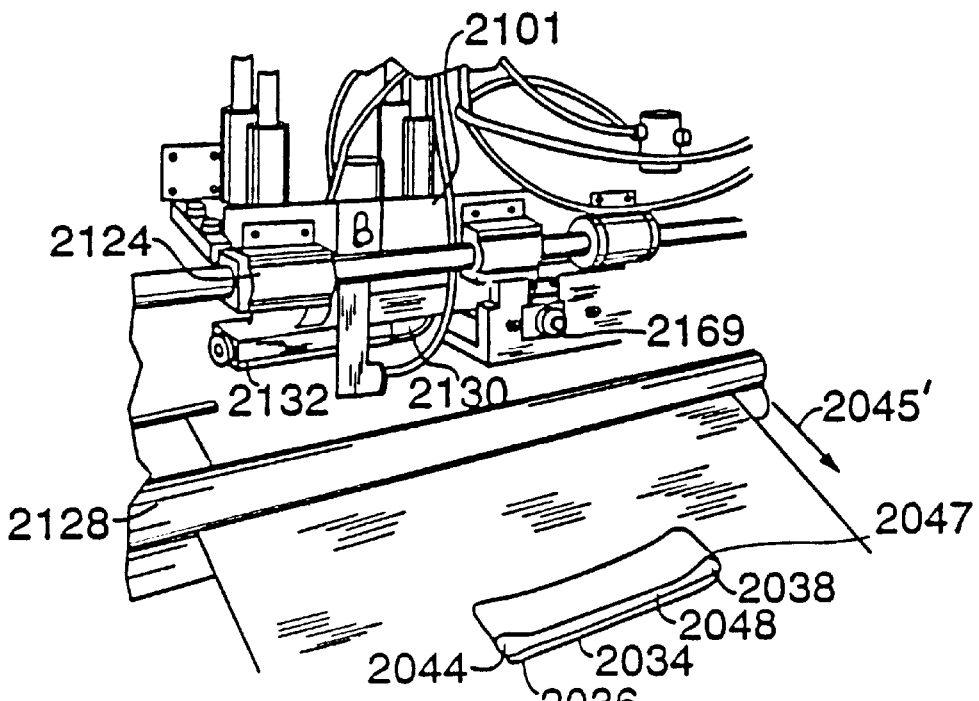
FIG. 28 is a front perspective view of the vacuum belt and sealing bar assembly of FIG. 27 and the web having fastener tape segments of FIG. 17.

It is understood that reclosable bag 2001 is generally formed in a form, fill and seal machine (as shown in FIG. 1), in which walls 2004, and 2028 are formed from a base web 2032 having a longitudinal direction of flow in the bag formation process as indicated by arrow 2045' (FIG. 28). Base web 2032 is joined to itself at back seal 2062 (FIG. 19) that extends between bag top end 2058A and bottom end 2059A along one side of bag body 2003.

Figure 17:
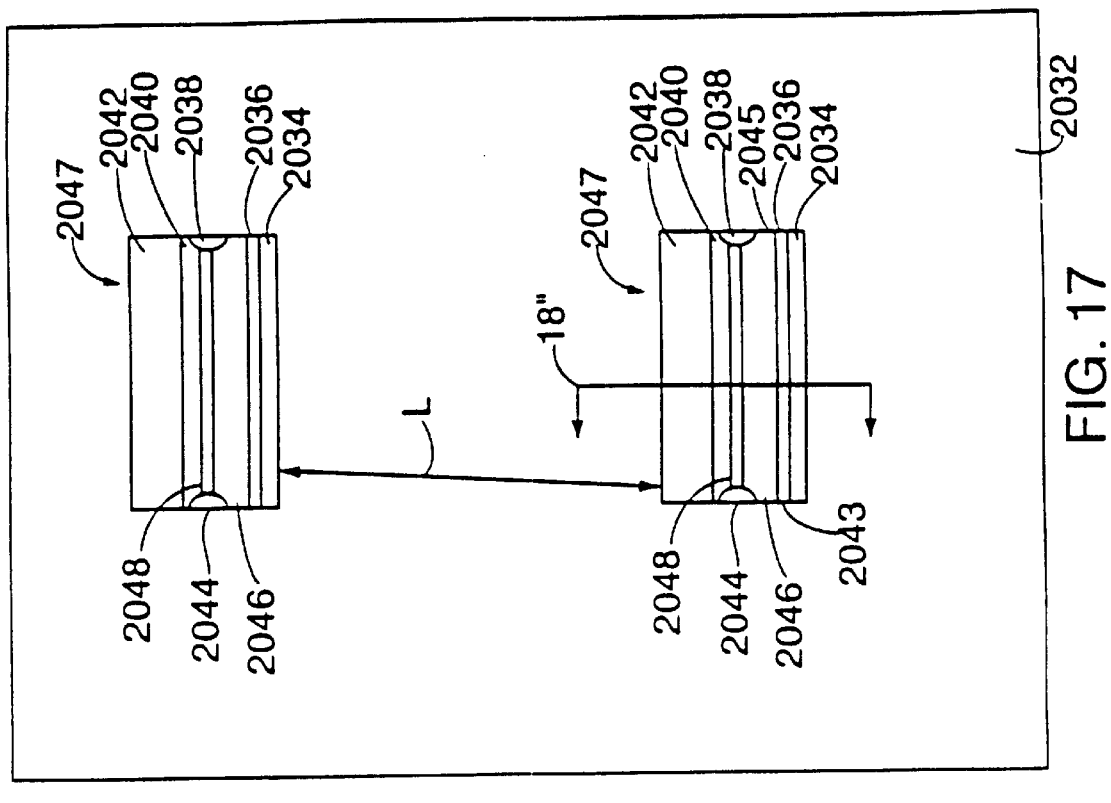
FIG. 17 is a top plan view of a web having fastener tape segments thereon.

As shown in FIG. 18, fastener strips 2012 and 2022 are formed from continuous one-piece extruded resiliently flexible plastic profiled reclosable fastener strip material. Fastener strips 2012 and 2022 are also sealed one to another at seals 2038, and 2044 (FIG. 17) so that the strips are in alignment with one another and interlocked together. It is appreciated that provision of seals 2038, 2044, in combination with the other seals herein, provide a hermetic seal so that the only access to the interior of bag 2001 is provided upon releaseably disengaging fasteners 2012, 2022. FIG. 17 illustrates base web 2032 for making a plurality of reclosable bags 2001. Base web 2032 is formed from conventional materials used in the snack bag and plastic bag industries such as polyethylene, paper/poly/foil/poly laminates, propylene, and other laminated and coated material. The base web 2032, is utilized in the method and apparatus described herein, and in FIGS. 20–33. Base web 2032 is an elongated roll of film having a longitudinal direction of formation indicated by arrow 2045'. Base web 2032 has secured thereto a fastener tape segment 2047 at transverse fastener tape segment seal 2036. In a preferred embodiment, seal 2036 extends continuously from fastener tape segment end 2043 to fastener tape segment end 2045. In an alternate embodiment, seal 2036 includes a plurality of spot seals for securing strip portion 2046 of fastener tape segment 2047 to base web 2032. It is appreciated that securing strip portion 2046 is sized and dimensioned to provide a large vertical sealing area in which transverse fastener tape segment seal 2036 can be disposed. Seal 2036 can be placed at any location in portion 2046. Seal 2036 can also include spot seals at any location in the sealing area. Hence, optional film lip 2034 (FIGS. 16–18) located below transverse fastener tape segment seal 2036 can be of varying height, but is preferably about an eight of an inch in height. In another variant, optional film lip 2034 is omitted.

Non-barrier containing upper portion 2040 (FIG. 17) of film strips 2006 and 2026 (FIG. 16) has an optional gap between the bottom edges 2041 and 2041 of barrier material 2014 and 2020 and fasteners 2012 and 2022. Barrier containing upper portion 2042 (FIG. 17) includes the portions of film strips 2006 and 2026 upon which barrier material 2014 and 2020 are disposed.

As shown in FIG. 17, secured to web material 2032 at bag length intervals L are a plurality of fastener tape segments 2047, sealed along the length of web 2032 and extending lengthwise across about less than half the width of web 2032. The fastener tape segments 2047 are oriented substantially perpendicularly to the direction of formation of the bag 2001, and are located near the ends of the bags into which web material 2032 is formed.

It is appreciated that fastener tape segment 2047 and the securing thereof to web 2032 prior to the formation of bag body 2003 in a form fill seal machine 2138 has a number of benefits. First, it is not necessary to directly seal the narrow individual fasteners 2012 and 2022 to the web. Sealing bars 2159 of sealing bar assembly 2167 (FIG. 20) seal securing strip portion 2046 to web material 2032 at seal 2036 FIG. 18. Further, as the web material 2032 (having fastener tape segment 2047 thereon), travels in the direction of arrow 2045' onto the forming collar 2140 of a form fill seal machine 2138 (FIGS. 30–31), there is a minimal risk that fasteners 2012 and 2022 (FIG. 18) will come apart when the web material is being processed. Further, seals 2038 and 2044 FIG. 17 secure fasteners 2012 and 2022 to each other, to prevent undesirable movement of one fastener in relation to another. Seals 2038 and 2044 also improve overall rigidity of segment 2047 and maintain fasteners 2012 and 2022 in alignment with one another during the bag formation process. It is appreciated that fastener tape segment 2047 may also function as an air foil as the current of air flows over the tape segment 100A in a direction opposite that indicated by arrow 2045'. Various types of barrier material can be used herein. However, the barrier material strips 2014 and 2020 do not seal one to another during the bag formation process, but readily seal to film strips 2006 and 2026 (FIG. 16).

Figure 20:
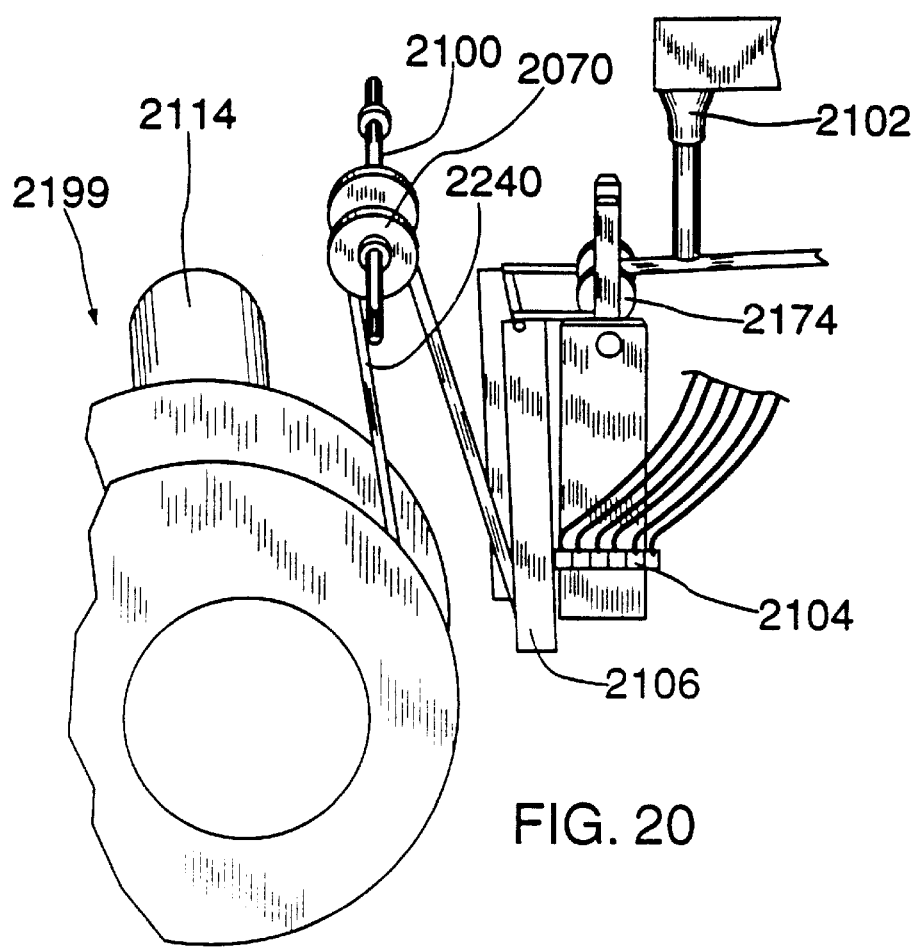
FIG. 20 is a side perspective view of the fastener tape dispensing assembly of the present invention.
Figure 21:
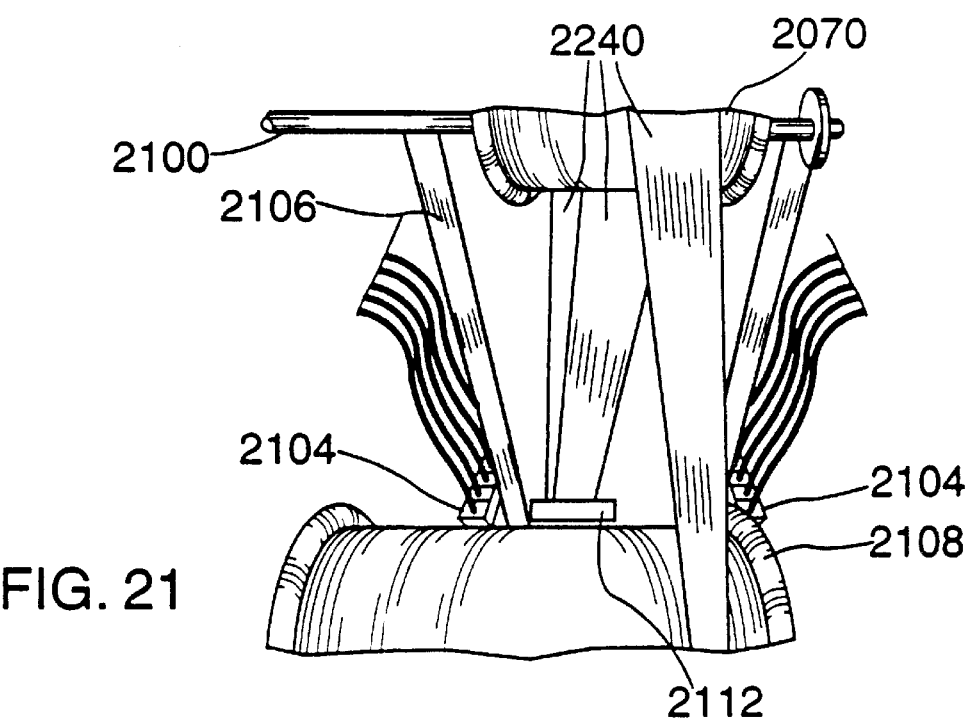
FIG. 21 is rear perspective view of the fastener tape dispensing assembly of FIG. 20.
Figure 20B:
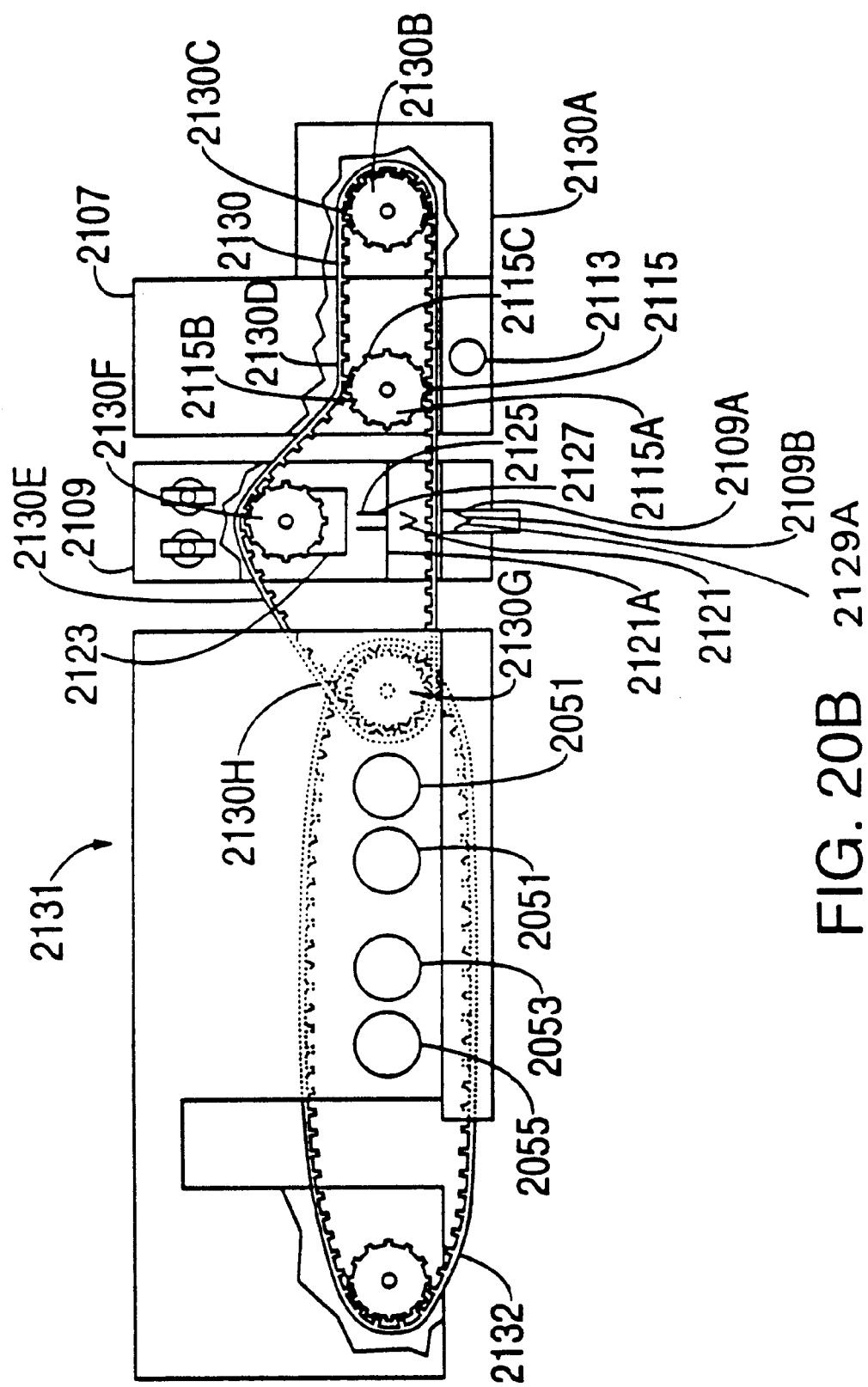
Figure 22:
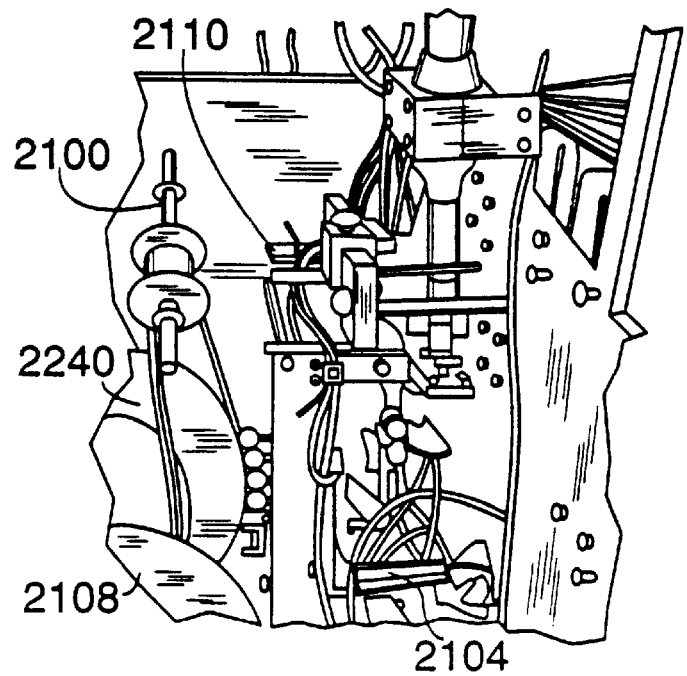
FIG. 22 is a side perspective view illustrating an ultrasonic sealing horn and cutter and the fastener tape dispensing assembly of FIG. 20.
Figure 23:
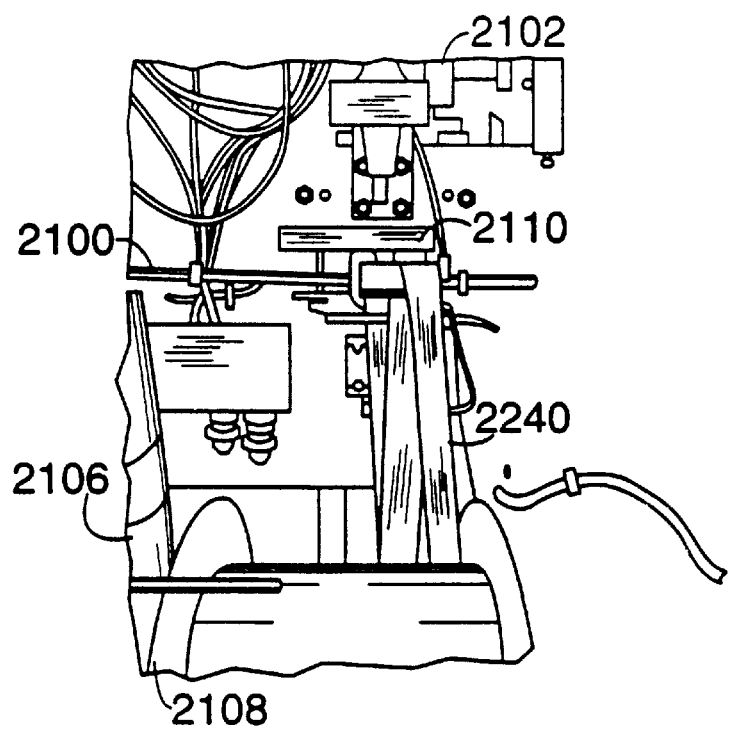
FIG. 23 is a rear perspective view illustrating the ultrasonic sealing horn and cutter of FIG. 22.
Figure 24:
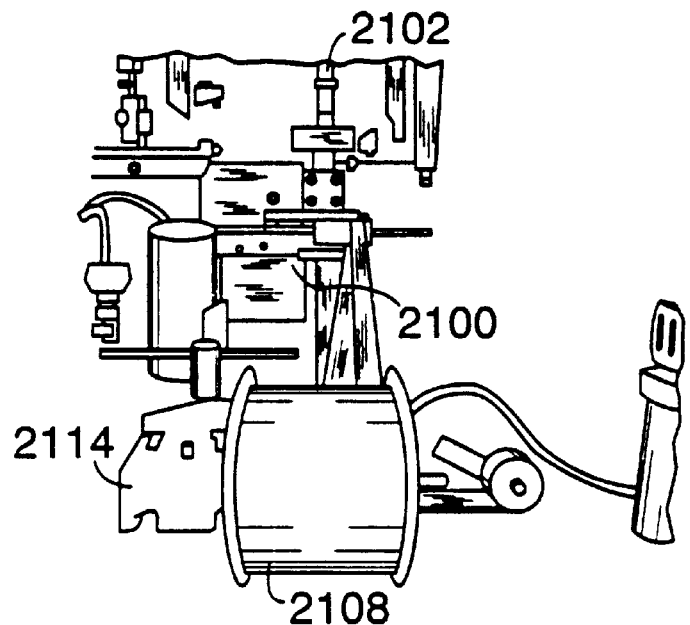
FIG. 24 is a rear perspective view illustrating a zipper spool drive and the fastener tape dispensing assembly of FIG. 22.

FIGS. 20–33 show an apparatus for manufacturing and sealing tape segments 2047 to base web 2179 and then using a form fill seal machine 2138 for making bag 2001 of the present invention. The form fill seal machine 2138 includes a zipper tape feed 2199 portion as shown in FIGS. 20–24. The zipper tape feed portion 2199 includes tension arm 2100 (FIGS. 20–24) for tensioning finished fastener tape 2240 (from which segments 2047 are formed) and for signaling fastener spool drive 2114 (FIG. 20–24) to rotate spool 2108. Fastener tape 2240 unwinds from zipper spool 2108 (FIGS. 20–24) and advances over roller 2070 and under a roller on floating arm 2106 (FIGS. 20, 21, 22, and 23) connected to film synchronizer 2112 (FIG. 20), and over roller 2174. Fastener tape 2240 then passes under ultrasonic sealing horn 2102 (FIGS. 20, 20A, 22, 23, and 24) where seals 2038, and 2044 are formed, through tape registration assembly 2105, and into tape drive assembly 2107. Tape registration assembly 2105, in combination with tape drive assembly 2107 advances tape 100 sequentially into tape cutter assembly 2109. Proper tension is maintained by rollers 2111, 2113 and 2115 (FIG. 20A) in tape registration assembly 2105, which adjusts tension based on the position of three loop dancer 490, and activation by photo sensor 460 (FIG. 1). Tape drive assembly 2107 includes nip drive 470 for feeding tape 100, as required into tape cutter assembly 2109. Nip drive assembly 470 includes rollers 2111A, 2113A and 2115A for advancing tape 100. When cutting die plate actuator 2117 pushes die plate 2119 forward under tape 100. Cutter blade 2121 then cuts downwardly through tape 100 by means of an air piston 2123 and shaft 2125 having blade 2121 attached to the distal end 2127 thereof. After full extension of shaft 2125, cutter blade 2121 is retracted, as is die plate 2119. A stripper 2129 helps strip tape 100 from blade 2121 and in fact urges tape segment 100A into tape sealer vacuum assembly 2131. Thus, fastener tape 2240 is cut into predetermined sections the length of segment 2047. It is preferred that segments 2047 be about less than half of the width of base web 2179. The control synchronizer 2110 (FIG. 23) synchronizes the feeding of fastener tape 2240 with the feeding of base web 2179 (FIG. 25) so that segments 2047 can be properly processed as described and sealed to base web 2179. The various operations are actuated by air pressure controls 2104 (FIGS. 20, 21, and 22).

Figure 25:
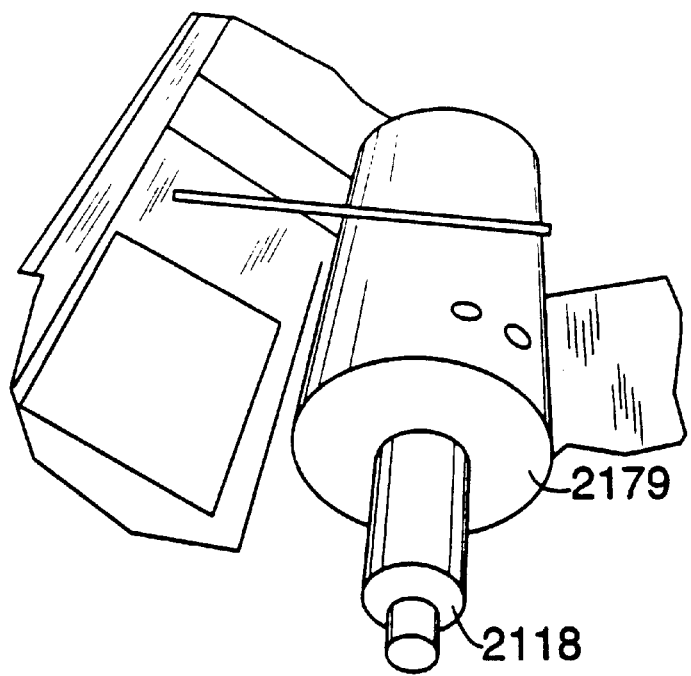
FIG. 25 is a side perspective view of a web material dispensing assembly of the form fill seal machine of the present invention and a roll of web material.
Figure 26:
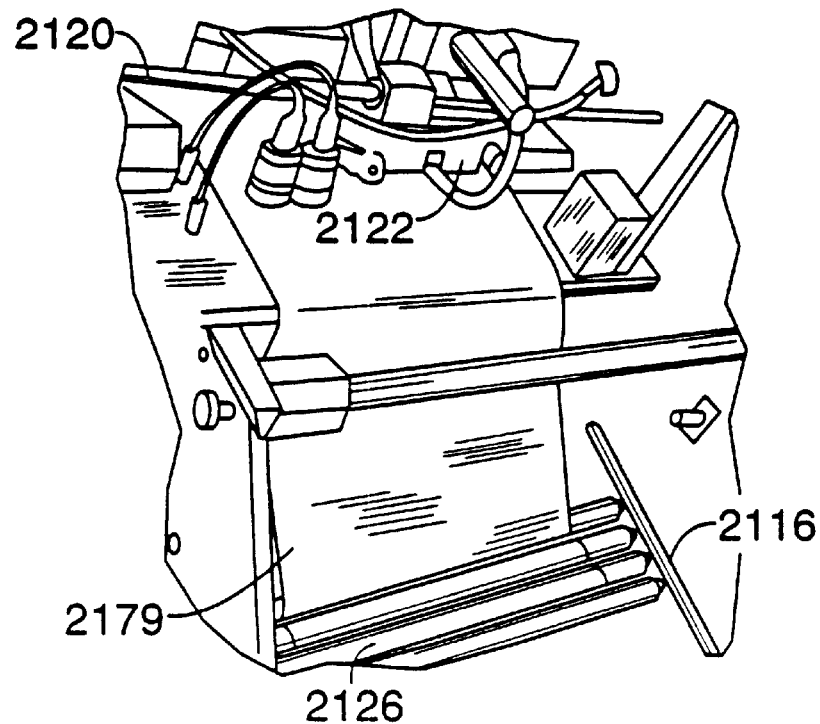
FIG. 26 is a rear perspective view of a web material dispensing assembly of FIG. 25.

Segment 2047 is next fed into fastener segment attachment assembly 2101 (FIG. 28). Fastener segment attachment assembly 2101 secures segment 2047 to base web 2179 and forms seal 2036. Base web 2179 advances into machine 2138 under the control of film speed quantity control 2116 (FIGS. 25 and 26). Base web 2179 is mounted on web spool drive 2118 (FIG. 25) that includes positioning shaft 2120 (FIG. 26). Base web 2179 travels through dancer rollers 2126 (FIG. 26) prior to arrival at fastener segment attachment assembly 2101 at the rear 2122 thereof.

Figure 27:
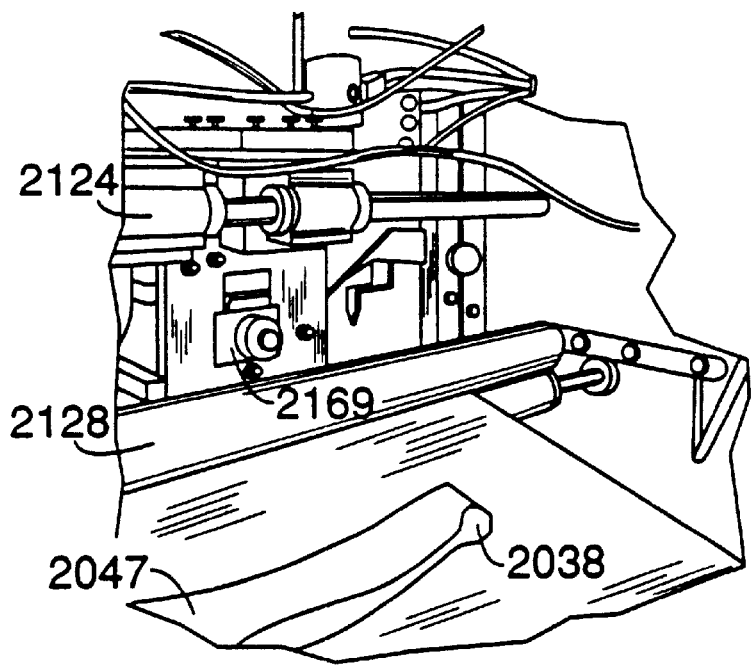
FIG. 27 is a front perspective view of the vacuum belt and sealing bar assembly of the present invention.

Segment 2047 is properly positioned and sealed on base web 2179 with a vacuum belt and sealing bar assembly 2131 (FIGS. 20-B, 26 and 27) having a front portion 2124 and rear portion 2122. The sealing bar assembly 2131 forms seal 2036 and positions segment 2047 on base web 2179 at an appropriate location. FIG. 26 illustrates the rear portion 2122 of vacuum belt 2132 and sealing bar assembly 2131. FIG. 27 illustrates that front portion 2124 of vacuum belt 2132 and sealing bar assembly. FIG. 28 illustrates vacuum belt 2132 and sealing bar assembly front portion 2124 including a belt drive 2169 for vacuum belt 2132 (FIG. 28) and vacuum belt 2132 (FIG. 28) which advances segment 2047 and properly positions segment 2047 on base web 2179. Four vacuum zones 2049–2051, 2053 and 2055 in vacuum manifold 2056' maintain tight control of segment 2047, and then in turn reverse air pressure and force segment 2047 fixedly against web 2179. Vacuum belt 2132 and sealing bar assembly 2131 include a horizontal sealing bar 2059, a tape support shelf 2161 and a sealing bed 2162A. Sealing bar 2059 includes a heating element 2165, and is mounted on a sealing bar press assembly 2167 which forces sealing bar 2059 downward against tape segment 100A for sealing to base web 2179. Vacuum belt assembly 2131 also includes a belt drive 2169 which advances tape segment 100A (2047) into the desired position over base web 2179. Prior to sealing, tight control of positioning of tape segment 100A is maintained by manifolds 2049, 2051, 2053 and 2055, as is the vacuum belt 2132 is advanced, controlled by tape registration assembly 2105 and tape drive assembly 2107.

As shown in FIG. 20-A, a roller drive 2130 for vacuum belts 2132 is shown. Roller drive 2130 comprises a servo motor 469 contained in container 2130A having a drive shaft 2130B. Shaft 2130B has a sprocket at 2130C on the distal end thereof. A rubber belt 2130D is disposed around sprocket 2130C and extends to a hub 2115A on nip roller 2115. Hub 2115A has a similar sprocket 2115B so that as shaft 2130B rotates it causes rotation of shaft 2130B. When rubber belt 2130D is driven it causes rotation of nip roller 2115. At the same time nip roller 2115 has a double hub 2115C so that a second belt 2130E extends therefrom over idle roller 2130F and drive roller 2130G on vacuum belt assembly 2131. It should be noted in this regard that idle roller 2130F could be a drive roller for use in a mechanically powered cutter assembly (not shown), replacing air piston 2123 (FIG. 20-A), if desired. Belts 2130E are again driven by hub 2115A, which drives belt 2130E which is mounted on sprocket 2130H, thereby causing rotation of drive roller 2130G. Thus, tape 100 is advanced by nip rollers 2113 and 2115, incrementally under cutter blades 2121, then stopped at the appropriate distance. Cutter blade 2121 then is pushed downwardly by air piston 2123 as is clamp 2121A. Clamp 2121A also forces spring loaded stripper 2109A downwardly and out of the way of cutting blade 2121. After cutting blade 2121 has cut tape segment 270, air piston 2123 is reversed so that shaft 2125 is pulled upwardly, thereby releasing Clamp 2121A and spring loaded stripper 2109A. Servo motor 469 than is actuated causing rotation of drive roller 2130G and hub 2215A so as to cause advancement of nip roller 2115 and vacuum belt 2132. Vacuum belt 2132 then picks up the leading edge of cut tape segment 270 and advances it over web 110, (FIG 1) where heat sealing is applied as shown in FIG. 20A. It should be noted that the spring loaded stripper 2109A, when it moves upwardly causes the leading edge of tape segment 270 to spring upward against vacuum belt 2132 so as to facilitate advancement of tape segment 270 and prevent jamming of the segment 270 in the slot 2109B in retractable die plate 2119 (FIG. 20A). Further shown in (FIG. 20A) is a ledge 2171 for which prevents the movement of web 110 below vacuum belt 2132 from causing displacement of tape segment 270 on vacuum belt 2132, as advancing tape segment 270 into position over web 110. The ledge 2171 is constructed of DELRIN® brand thermoplastic elastomer so as to provide a slick surface and to eliminate static electricity created by the movement of web 110 approximate thereto. Alternatively, other materials such as TEFLON® (polyethylene-terephthalate) could be used.

Figure 32:
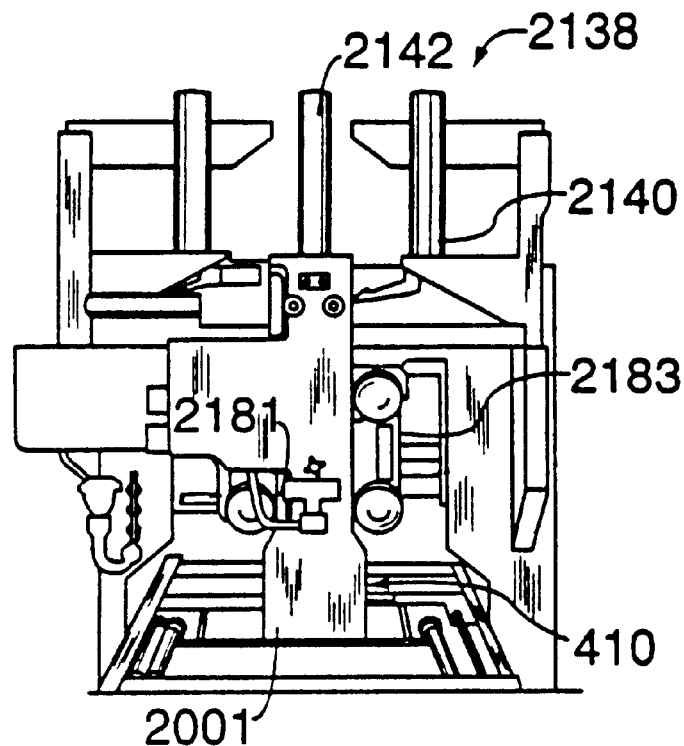
FIG. 32 is a front view of a form fill seal machine.
Figure 33:
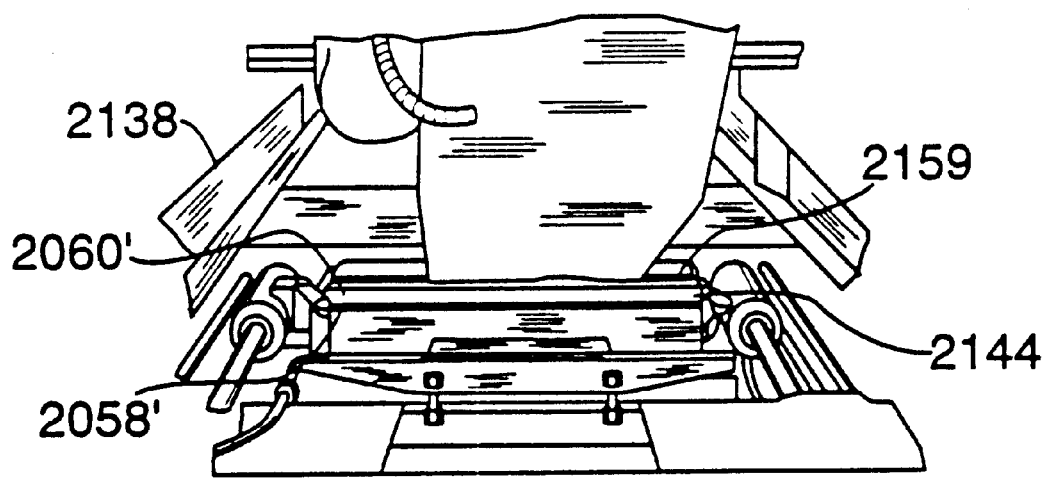
FIG. 33, is a close up view of sealing bars and a cutting knife of FIG. 32.

After the segment 2047 is sealed to base web 2179 rubber nip roller 2128 (FIGS. 27 and 28) advances the base web 2179 having segment 2047 forward. The base web 2179 having segment 2047 is then fed through form fill seal machine 2138 dancer rolls 2136 (FIG. 29) into the form fill seal portion of machine 2138 (FIG. 32). The base web 2179 having segment 2047 sealed thereon is fed over forming collar 2140 (FIG. 32) and filling tube 2142 (FIGS. 30–31) by the belts 2181 and 2183 shown in FIGS. 32. Back seal 2062 is formed. Sealing bar 2159 and cutting knife assembly 2144 (FIG. 33) form seals 2056, 2058, and 2060 simultaneously and sever the finished bag. Sealing bar 2159 includes first set of sealing bars (not shown) and second set of sealing bars 2058'. The first set of sealing bars (not shown) forms seal 2056. The second set of sealing bars 2058' forms seal 2058. Seal bar 2060' forms seal 2060. Knife 2144 cuts the partially formed bag between seal bars 2058' and 2060'. It is appreciated that this method of forming seals 2058 and 2060 with sealing jaws 2058' and 2060' provides a benefit. Seal 2058 having a width W at top portion 2000 is generally narrower than seal 2060 having a width W. This facilitates opening of the top end of bag 2001 by providing a weaker seal at the top end of bag 2001 than at the bottom end of the bag while simultaneously providing a hermetic seal of the top end of the bag and a stronger lower seal at the lower end of the bag. Hence, it is appreciated that the invention provides for a bag 2001 that requires a differential opening force to open the top end of the bag versus the bottom end of the bag.

Figure 34:
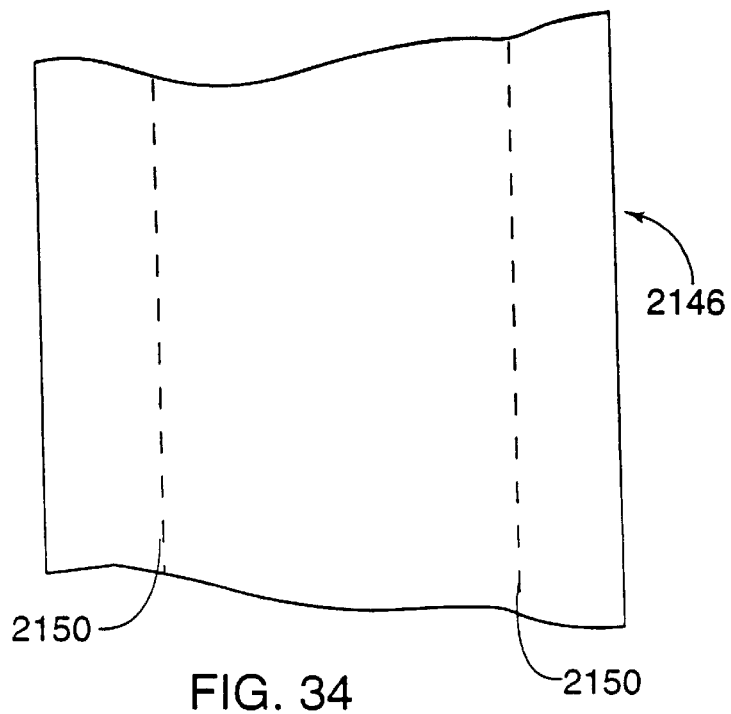
FIG. 34 is a top plan view of laminate material used in the manufacture of fastener tape.

FIGS. 35–38 illustrate a bag and method of forming a bag in a horizontal form fill seal machine 2138. A web of thermoplastic material which is preferably about 1 mil thick and is a laminate material is formed and wound on standard 3 or 6 inch cores to be used as interior end cap 2146. Interior end cap 2146 goes through an operation in which perforations 2150 are formed thereon as indicated in FIG. 34. The laminate material from which interior end cap 2146 is formed is a non-stretchy base thermoplastic material such as polypropylene with a thin sealant layer 2562 on one side thereof, or on each side thereof. The preferred width of the finished roll of interior end cap 2146 is about three and one half inches or less. The web material is perforated in the web direction as shown in FIG. 34.

Figure 37:
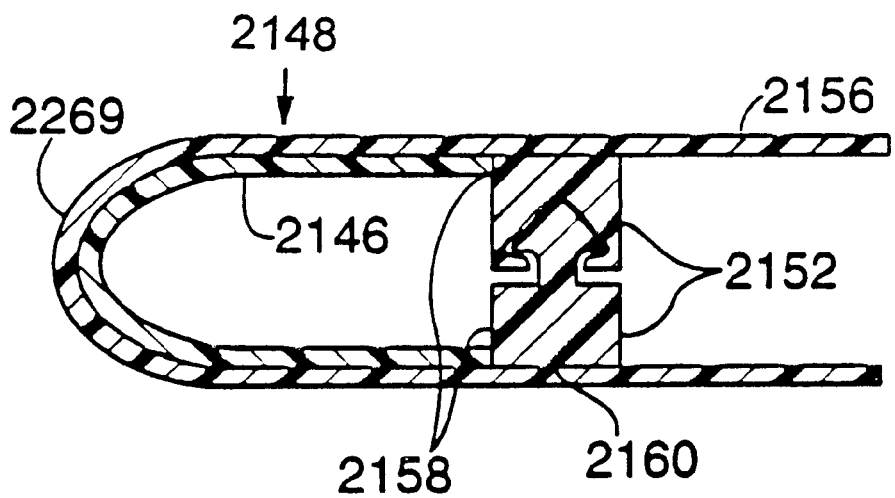
FIG. 37 is a side cross sectional view of the partially processed fastener tape assembly of FIG. 36 having a fastener sealed to the sealant layer of the base web.
Figure 38:
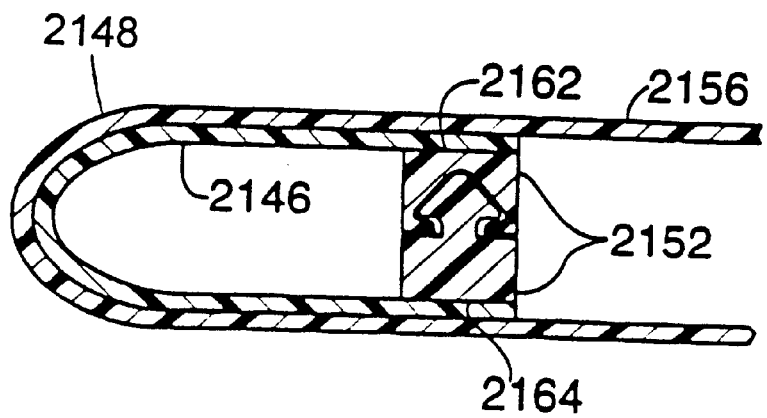
FIG. 38 is a side cross sectional view of the partially processed fastener tape assembly of FIG. 36 having a fastener sealed to the interior cap at ends thereof.
Figure 39:
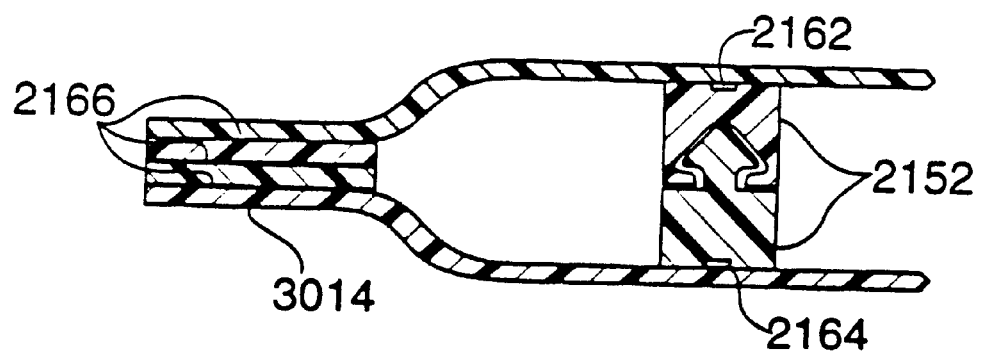
FIG. 39 is a side cross sectional view of a variant of FIG. 37 having a sealed header portion thereof.

A modified AMI-RD (reduced size applicator for connecting fastener and interior cap 2148 to web) applicator system 120 is used for the application of interior cap 2146 and webless fastener 2152 (FIGS. 37–39) to base web 2154 (FIGS. 36–38) for the manufacture of bags. The method of making the bags includes the steps of sealing interior cap 2146 onto base web 2154 to obtain interior cap/web assembly 2148, center folding the interior cap/web assembly 2148 to obtain folded base web 2156 (FIGS. 36–38), introducing webless fastener 2226, 2152 between the opposing walls 2567 of the folded base web 2156 (FIGS. 36–38), and sealing fastener 2152 to opposing walls 2567. Fastener 2152 and header 3014 (FIG. 39) are sealed at the same RD station. In lieu of opening the web, as an RD system 120 ordinarily does, the folded base web 2156 is turned and delivered to a horizontal "shred" machine (not shown), in line and at the height desired. As shown in FIGS. 37 and 38, fastener 2152 can be sealed at the ends of interior cap 2158 (FIG. 37) or to a sealant layer of base web 2156 (FIGS. 35 and 37) at fastener seals 2162, 2164 (FIG. 39). Header seals 2166 (FIG. 39) and fastener seals 2162 and 2164 can be formed simultaneously or at different stations. The web is delivered, in-line and upright, to a horizontal machine.

The finished package is substantially flat and neat, improving package appearance, and the overall improving quality of the package. The function of opening the package is improved since the package is opened via the tear notch, (perforations 2150), and along the perforations 2150. Then, when header 3014 is completely torn off by the user, the opening tabs are completely intact and parallel. Since the package is more uniform, opening and reclosing the bag is made easier using the reclosable fastener 2152. The machinery for making the above referenced invention includes continuous moving operations that require less maintenance and result in more reliable operation. Optionally, base web 2156 includes perforations 2151 that are complementary to and aligned with perforations 2150 of interior cap 2146. It is appreciated that perforations 2150 and 2151 FIG. 39A allow a user to readily open the bag formed with these elements, and easily access the bag formed utilizing these elements. Perforations 2150, 2151 are preferably located between centerfold 2269 and fastener assembly 2152. In an alternate embodiment, perforations 2150 are omitted.

Figure 35:
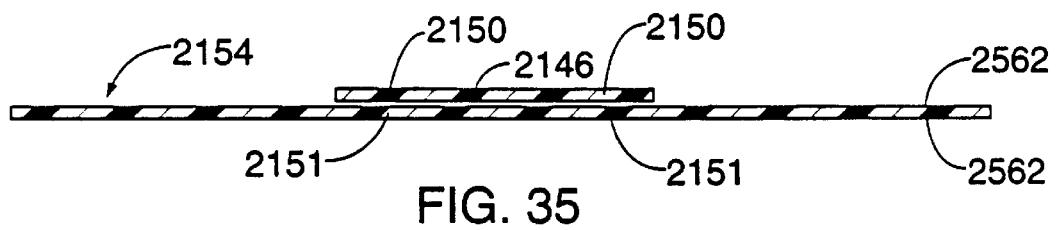
FIG. 35 is a side cross-sectional view of an interior cap sealed to a base web of a partially processed fastener tape assembly.
Figure 36:
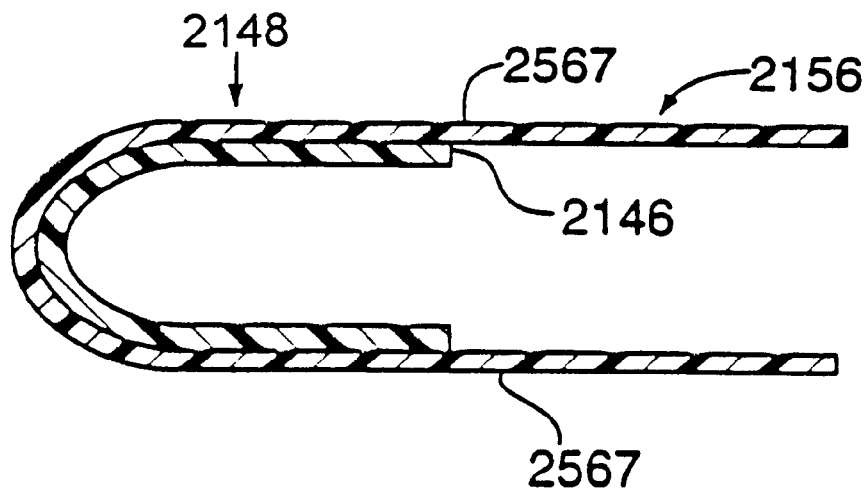
FIG. 36 is a side cross-sectional view of the partially processed fastener tape assembly of FIG. 35 after a folding operation.
Figure 39A:
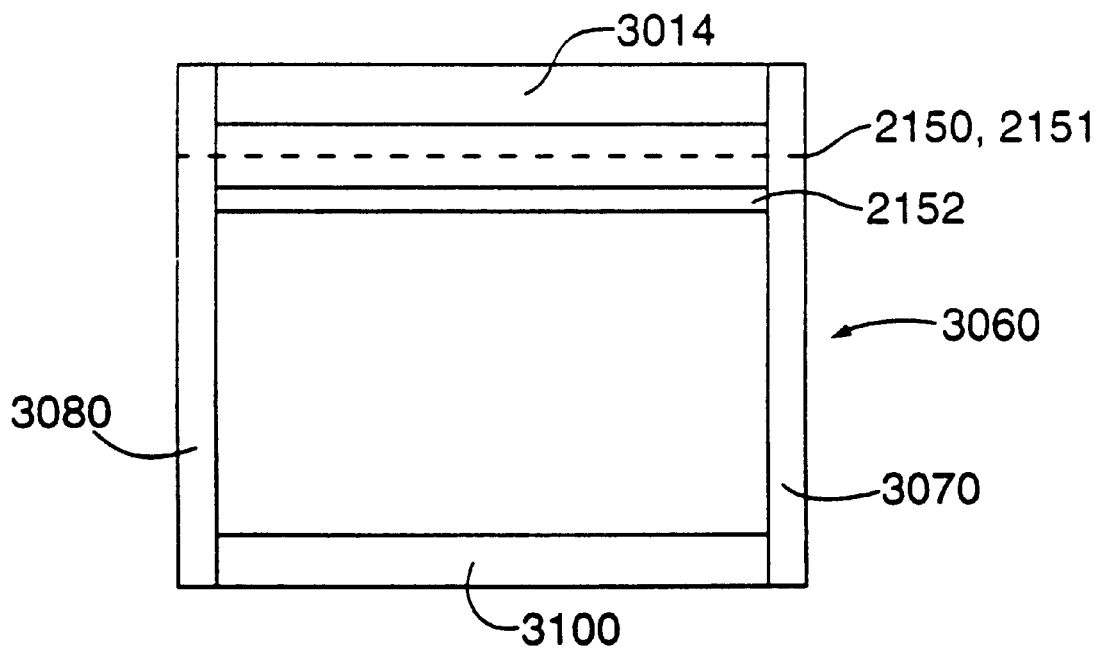
FIG. 39a is a top plan view of a reclosable bag utilizing the web of FIG. 35.

FIG. 39a is a top plan view of a reclosable bag 3060 made from the web of FIG. 35. Bag 3060 includes a header 3014, a bottom seal 3100, and side seals 3070, and 3080 forming bag body. Fastener assembly 2152 is positioned below perforations 2150 and 2151 so that when header 3014 is removed, a tear forms along perforations 2150 and 2151 providing access to reclosable fastener assembly 2152.

Figure 40:
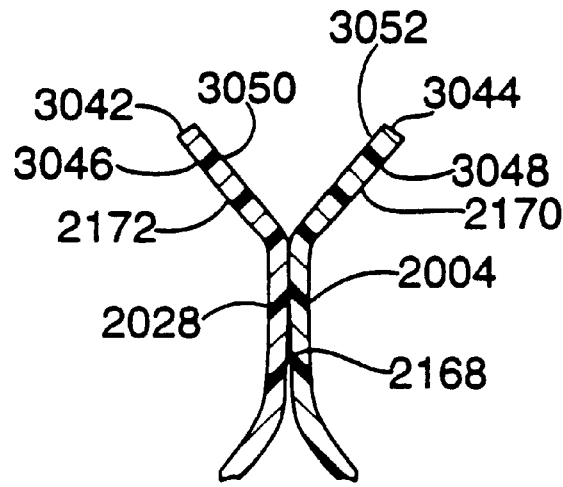
FIG. 40 shows a variant of the top of the bag of FIG. 19 in which gripping flanges are provided above an adhesive seal sealing the bag wall together.

FIG. 40 illustrates a variant of the top portion of bag 2001 that includes means for easy access to fasteners 2012, 2022. The top end of bag 2001 includes adhesive layer 2168 (FIG. 40) above fastener segment 2047 but below bag wall ends 3042, 3044. This adhesive layer 2168 is applied using conventional adhesives that are readily separated by the mechanical opening force generated by a user's fingers. This adhesive layer 2168 hermetically holds together and seals walls 2004 and 2028 during shipment and storage of bag 2001. Adhesive layer 2168 can be applied to web 2032 before the web moves onto the forming collar 2140. Opening of the bag 2001 to access interlocked fasteners 2012, 2022 is facilitated by provision of bag wall pull flanges 2170 and 2172 (FIG. 40) which are formed from bag walls, 2004 and 2028. It is also contemplated that the inside and/or outside surfaces 3046, 3048, 3050, 3052 of bag wall pull flanges 2170 and 2172 can be textured, ribbed or grooved so that gripping thereof by a user and opening of the bag top can be facilitated.

Figure 41:
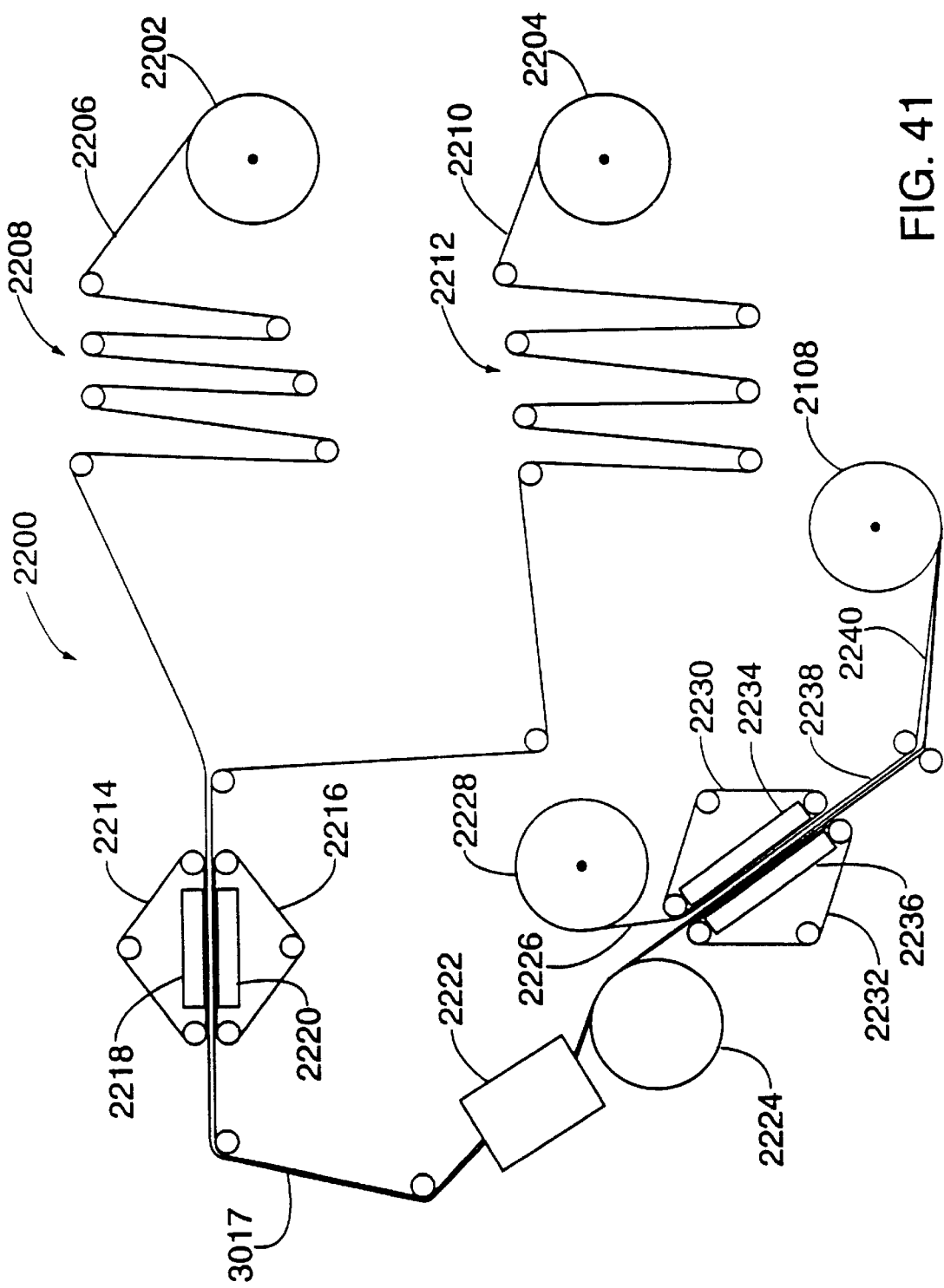
FIG. 41 is a diagram of an apparatus for forming the fastener tape illustrated in FIG. 20, 21 and 23.

FIG. 41 illustrates an apparatus 2200 for forming fastener tape 2240. Apparatus is used to make fastener tape 2240 described herein using the methods described herein. Base tape 2206 is fed from roll of tape material 2202 onto dancer rollers 2208. Barrier material 2210 is fed from roll of barrier material 2204 onto dancer rollers 2212. Barrier material 2210 and base tape 2206 are aligned, and positioned with respect to each other. In one variant the center of barrier material 2210 is aligned with the center of base tape 2206. In another variant, the barrier material 2210 is positioned on base tape 2206 to provide for portion 2046. Barrier material 2210 and base tape 2206 are sealed to each other and advanced by belts 2214 and 2216. Sealing bars 2218 and 2220 seal barrier material 2210 to base tape 2206 at seals 2016, 2050, 2018 and 2052 to obtain a sealed barrier/base material assembly 3017. The seals may be continuous or periodic. Sealed barrier/base material assembly 3017 is next folded at fold station 2222. The barrier material 2210 is directed to the inside of the assembly 3017 and the base tape 2206 material is directed to the outside of the assembly 3017. Webless fastener 2226 is fed from roll of webless fastener 2228 and aligned and positioned between the base tape 2206 material as shown in the figures herein. Optionally base tape material 2206 may be fed by roller 2224. Belts 2230 and 2232 advance the materials and sealing bars 2234, 2236 seal the webless fastener 2226 (interlocked profiles 2012, 2022) to assembly 3017. The fold formed at fold station 2222 is slit at slitting station 2238 to provide the finished fastener tape 2240, which may then be rolled into a roll of finished fastener tape 2242, or used immediately. Preferably, the base tape material 2206 is about 3.5 inches wide while the barrier material strip 2210 is about 2 inches wide.

A method of making tape 2240 having reclosable fasteners 2226 thereon is provided. The method comprises the steps of supplying a continuous strip of tape 2206, a continuous strip of barrier material 2210, and a continuous strip of fastener 2226 having first and second interlocked fastener profile strips 2012, 2022; positioning continuous strip of barrier material 2210 on continuous strip of tape 2206; securing continuous strip of barrier material 2210 to continuous strip of tape 2206 to obtain a continuous strip of barrier tape 3017; folding, (off-center, or center folding) barrier tape to obtain a fold and two opposing barrier tape fastener strip connecting portions; positioning fasteners 2226 having first and second interlocked fastener profile strips 2012, 2022 between the two opposing barrier tape fastener strip connecting portions; securing the first interlocked fastener profile strip 2012 to one of said opposing barrier tape fastener strip connecting portions; securing the second interlocked fastener profile strip 2022 to the other barrier tape fastener strip connecting portion; and, slitting the fold to form two separate continuous strips of barrier material 2210 (strips 2014, 2020), and slitting the base web 2032, 2154 to separate the base web 2032, 2154 into strips of thermoplastic material.

The invention described herein which secures the segment 2047 to a base film is independent of the form fill seal apparatus 2138 ultimately used to form fill and seal bag 2001. Two sets of dancers 2134 and 2136 (FIG. 29) are used so that any bagger apparatus 2138 can be retrofitted. Barrier material 2210 is polypropylene on the inside and polyethylene on the outside so that seals 2018, 2052, 2016, and 2050 can be formed while the inside surfaces 3073 are non-sealable one to another. In a preferred embodiment, the sealing side of barrier material 2210 has blended therein metalasine. The materials described herein are commercially available from Curwood Co., 220 Badger Ave., Oshkosh, Wis. Atlanta Film in the State of Atlanta, and Print Pak, Inc.

Figure 42:
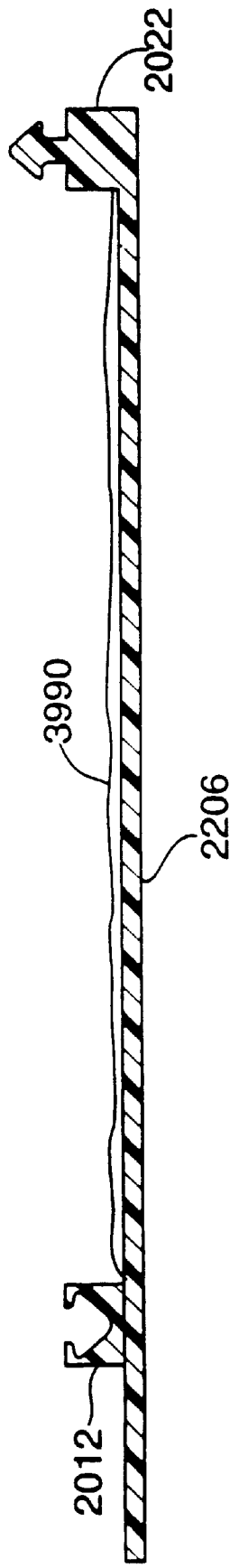
FIG. 42 is a side cross sectional view of a variant of the fastener tape described herein having a non-sealing nitrocellulose coating thereon; and, FIG. 43 illustrates a top plan view of a variant of a top portion of a reclosable bag of the invention.

In yet a further embodiment, it is possible to eliminate barrier material 2210. In this embodiment shown in FIG. 42, a substantially pure, food grade, nitrocellulose coating 3990 is applied to base tape material 2206 as shown in FIG. 42. The other method steps described above are performed to obtain the final fastener tape. Application of coating 3990 makes strips 2026 and 2006 (FIG. 16) non-sealable to one another in the inside loop area which is ultimately slit. It is further contemplated that other food grade coatings may be used to render strips 2026 and 2006 non-sealable one to another.

Figure 43:
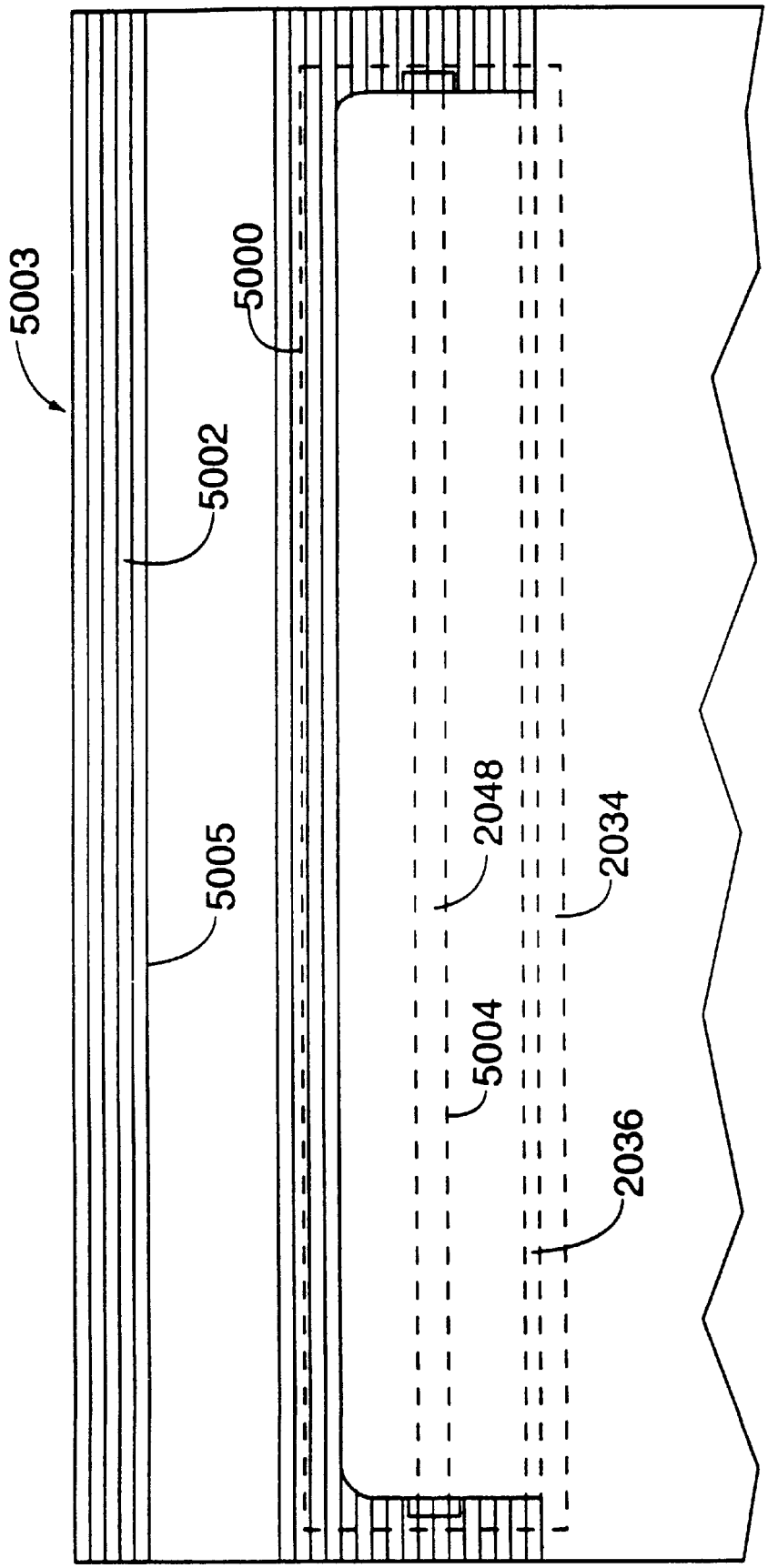

FIG. 43 illustrates the top portion of a mono-polymer package 5003, as for IQF (instant quick freeze) vegetables. In this variant, the embodiment of fastener tape as processed in FIG. 41 is used such that the tape has the substantially pure, food grade, nitrocellulose coating 3990 illustrated in FIG. 42. Web 2206 is folded onto itself so that fasteners 2012 and 2022 interlock. Web 2206 is then slit as described above to obtain tape 2240 but without the barrier material strips. Suitable inks can also be used to make the strips non-sealable to one another.

Seal 5000 is made with a bagger sealing jaw (not shown) in the shape of the seal illustrated in FIG. 43. Seal 5000 is disposed approximately ¾" below top seal 5002 in a preferred embodiment. Seal 5000 is similar to top seal 2058 and bottom seal 2060 in the other figures, but in this variant top seal 5002 and bottom seal 2060 (not shown) can be of the same size. The extra layers of strips 2006 and 2026 (FIG. 16) that are sealed to bag walls 2028 and 2004, while they do create some extra thickness, do not create a thickness of material that is beyond the capability of the sealing jaw to properly seal, even when the bagger sealing jaw is in the same plane as the sealing jaws that create the top and bottom seals 2058, 2060. Due to the lack of thickness of the strips 2006, 2026, seal 5000 readily blends from four thicknesses to about two thicknesses. Hence, seal 5000 is continuous with no break in seal quality even though it comprises a step down from the four thicknesses to the two thicknesses.

In some application such as IQF that do not require the bag to be hermetically sealed, there is no need to seal off the ends of the fastener strip. Seal 5000 extends to and through the side fold of bag 5003, as top seal 5002 and bottom seal 2060 (not shown) do. This allows seal 5000 to be made with the same seal bars, regardless of bag width. The finished package 5003 can be filled with its contents above the zipper profile line 5004. The fastener strip is sealed to the front panel of bag 5003 and the product content of the package can be filled above and behind the profiles horizontal location, as the thin strip material will align itself with and be pushed against the front panel when being filled. The extra length of the package is the distance between the bottom of the top seal 5005 and the bottom of seal 5000. This distance is proportional to the accuracy of bagger registration.

Figure 44:
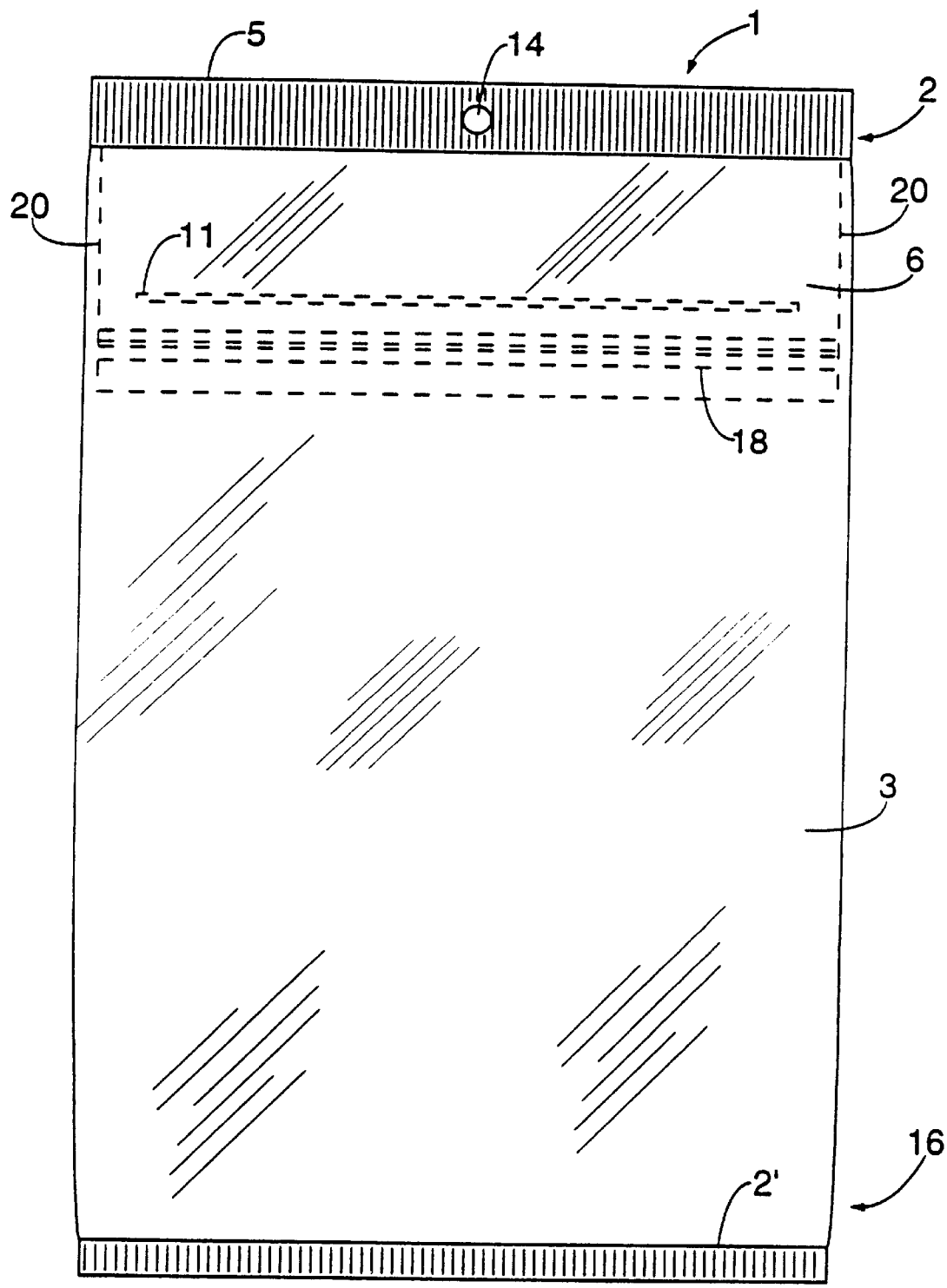
FIG. 44 is a front elevational view of the improved reclosable plastic bag of the present invention.
Figure 45:
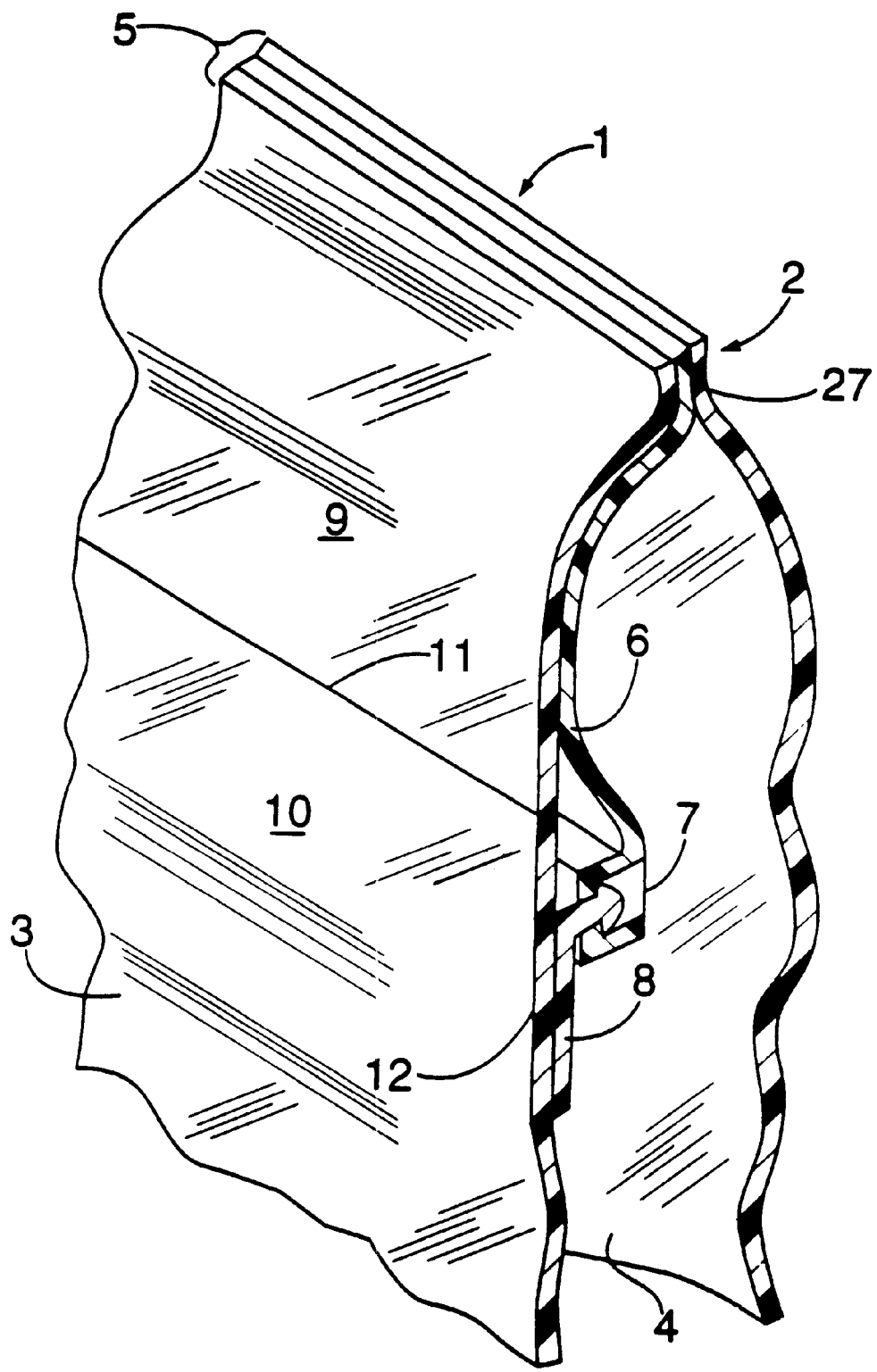
FIG. 45 illustrates a perspective sectional view of an improved reclosable plastic bag of the present invention of FIG. 44.

FIGS. 44 and 45 illustrate reclosable plastic bag 1 of the present invention. Reclosable plastic bag 1 includes a top end generally indicated by numeral 2 and a bottom end indicated by numeral 16. Bag 1 has a front wall 3, a back wall 4, and a seal 5 at top end 2 at which interlocking fastener profile lip 6 is sealed to front wall 3 and sealed to back wall 4. The tri-laminate structure at top end 2 of walls 3, 4, and lip 6 increases the strength of top end 2 producing increased tear resistance at this portion of the bag during the manufacturing process and also when the bag is displayed at a retailer. Top end 2 optionally contains an aperture 14 that extends through walls 3, 4, and lip 6 that is used to hang reclosable plastic bag 1 on hooks in retail stores. Bag 1 also has seal 2' at bottom end 16 at which front wall 3 and back wall 4 is connected. Back wall 4 includes two vertical portions 52, 54 (FIG. 47) having ends 56, 58 thereof that are sealed to create seal 24.

Interlocking fastener lip 6 is sealed to front wall 3, and back wall 4 at top end 2 as indicated by seal 5 at top end 2. Sealing of lip 6 is an important feature of the present invention since the size, shape and location of lip 6 allow for a single simultaneous sealing step to be used to seal front wall 3 to lip 6, and lip 6 to back wall 4. The seals of the present invention are preferably made by heat sealing as is well known in the art to prevent air or liquids from entering or leaving bag 1. However, other forms of sealing can also be utilized herein. It is appreciated that the lip 6 can, in a variant, be disposed on the sides or bottom of bag 1 as required.

Interlocking fastener lip 6 forms a portion of interlocking fastener strip assembly 18 that includes first engaging member 7 and a complimentary engaging member 8. As illustrated in FIG. 45, complimentary engaging member 8 is illustrated as having a male engaging prong that releasably interlocks with engaging member 8 which is shown as a female receptacle. Male and female portions of members 7, 8 can be readily interchanged. Many types of fastener assemblies are known in the reclosable plastic bag art and can be used with the present invention. Optionally, ends 20 of interlocking fastener lip 6 are heat sealed to front wall 3.

Lip 6 both reinforces top end 2 to prevent top end 2 from tearing where walls 3, 4 are sealed to lip 6; serves to flexibly attach first engaging member 7 to bag 1, to support first engaging member 7, and to align first engaging member 7 with complimentary engaging member 8; and, serves as a fail-safe barrier to prevent or reduce the risk of contamination or release of the contents of bag 1 in the event of inadvertent or accidental separation of upper portion 9 from lower portion 10 of front wall 3 along optional rupture line 11 which can be manually manipulated to separate upper portion 9 from lower portion 10. Preferably, score or rupture line 11 is frangible upon manual manipulation thereof by a user and is located above and substantially parallel to seal 12 at which complimentary engaging member 8 is joined to wall 3. Score line or rupture line 11 serves the dual purpose of protecting the contents of the container and providing a safety seal to show that bag 1 has not yet been opened. Lip 6 can be formed of any material, but is preferably formed of the same material as the rest of bag 1. Lip 6 can further contain advertising, nutritional or gaming indicia thereon.

It is appreciated that lip 6 and front wall 3 further provide a pouch into which coupons, product samples, and/or other advertising material (not shown) can be placed. As such a consumer first opens front wall 3 along rupture line 11 to expose the material in the pouch without opening up the contents of the larger storage volume in bag 1. It is further appreciated that this informational material is separated and protected from the contents of the remainder of bag 1 during the shipping and display process. The pouch of bag 1 can also contain material that is to be used in conjunction with the contents of the larger storage volume, but that needs to be separated from the larger storage volume material until it is needed.

Figure 46:
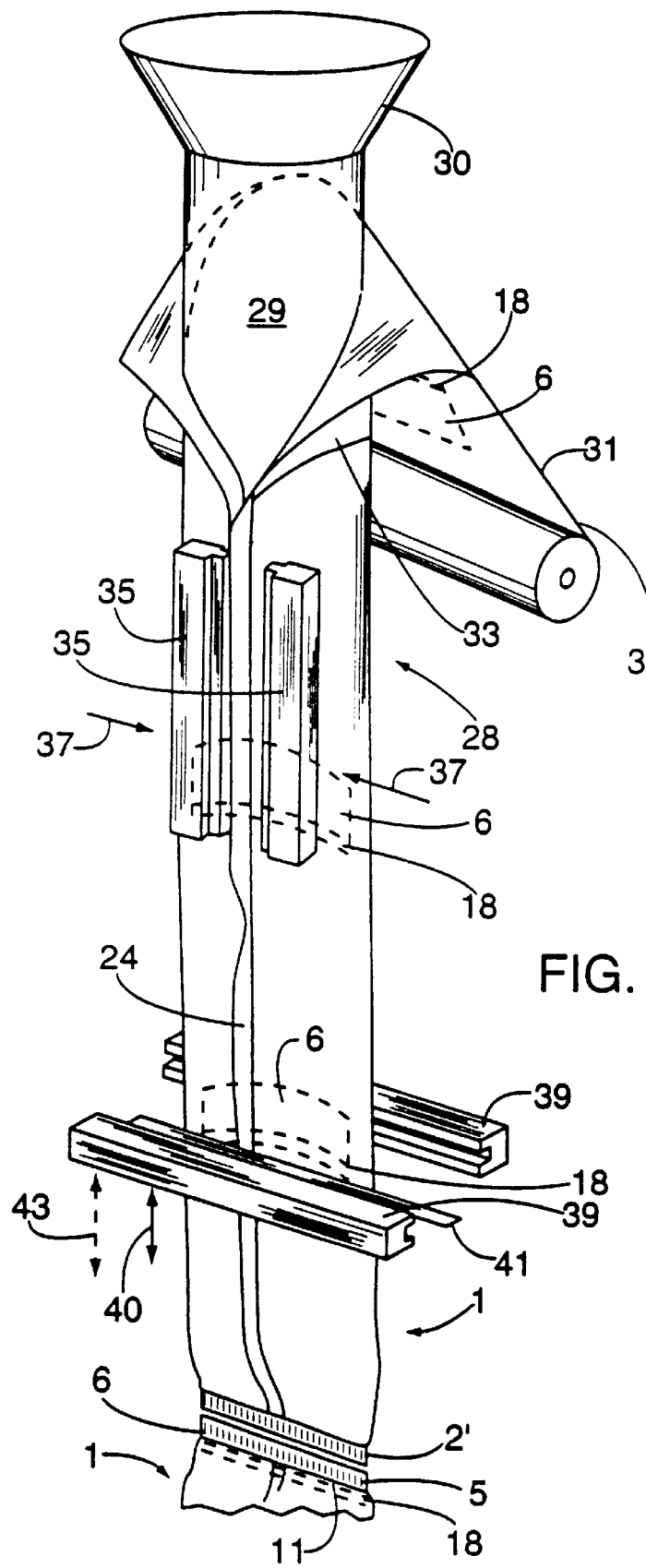
FIG. 46 is a perspective view of a vertical bag forming, filling and sealing apparatus for manufacturing bags of the present invention.

Multiple bags 1 as illustrated in FIGS. 44–46 are manufactured by supplying web material 31, whether single ply or laminated to a form, fill and seal machine 28 as shown in FIG. 46. Such machines are known in the art and include a combination bag forming and filling nozzle cylinder 29 adapted to receive products to be filled into the formed bags from a hopper 30. Bag making web 31 has thereon complementary engaging members 8 sealed to portions of bag making web 31 that will become the front walls 3 of bags 1 in the manufacturing process. The complementary engaging member is releasably interlocked to engaging member 7 either before or after member 8 is sealed to wall 3 at appropriate intervals. At this juncture, end 27 of lip 6 is not joined to wall 3. Web 31 is guided by means of guide roller 32 to the cylinder outer surface of cylinder 29.

At cylinder 29, a folding or wrapping arm device 33 guides and wraps web 31 about the cylinder 29 with the longitudinal margins of web 31 brought together into a longitudinal assembly which is sealed to form closure seam 24. Closure seam 24 is formed by vertical sealing bars 35 which move inward as indicated by numeral 37. Bars 35 then separate to release the heat sealed seam 24 of the closed bag forming tube of web material 31. Closed bag forming tube of web material 31 is advanced by means of a pair of horizontal, parallel bag end sealing bars 39 that reciprocate to clamp the bag web tube below the end of the cylindrical forming and filling nozzle member 29 and simultaneously seal the top end 2 of a filled bag section and the bottom end of a succeeding bag section.

It is appreciated that sealing bars 39 simultaneously seal front wall 3 to end 27 of lip 6, and end 27 of lip 6 to back wall 4 in a single step. Then sealing bars 39 still gripping the bag web tube move downwardly a bag section length as indicated by directional arrow 40 to pull and advance the entire bag making tube one bag length. As this step occurs, the next succeeding bag is filled with product dropped down cylinder 29 from hopper 30. As bags are sealed and pulled down, a cut off bar 41 cuts midway across seals 2' and 5, thus releasing the previously filled bags 1 which are handled as desired. Having completed its downward stroke cut off 41 returns to its starting position as indicated by arrow 43.

Bag 1 is airtight prior to the separation of upper portion 9 of front wall 3 from lower portion 10 of front wall 3 to gain access to recloseable fastener assembly 18. Generally, a user will manually separate upper portion 9 from lower portion 10 manually at score, rupture line or perforation 11. Separation of portions 9 and 10 will open up the first storage volume defined by upper portion 9 and lip 6, to the environment. Fastener assembly 18 is then manipulated to open the second storage volume of bag 1 to the environment. Optionally upper portion 9 of wall 3 is scored to form a flap that includes three score lines, e.g. score line 11 and two score lines perpendicular thereto that start at score line 11 and terminate at seal 5 (not shown). The flap includes upper portion 9 of wall 3 and is pivotally connected to bag 1 at seal 5. It is appreciated that provision of this flap allows for ease of access to fastener assembly 18.

The invention further provides a method of making reclosable bags that is more efficient and economical than conventional methods, and requires fewer method steps. Lip 6 is joined to walls 3, 4 in a single sealing step rather than multiple sealing steps. As such the manufacturing process requires fewer sealing steps as only seals 5, 2', 12, and 24 are required to form the storage volume of bag 1 and also provide for the attachment of fastener assembly 18. It is further appreciated that two distinct storage volumes are formed using the same number of sealing steps.

Interlocking fastener lip 6 forming a portion of engaging member 7 is not sealed to walls 3 or 4 at this juncture but rather rests against the inside surface of front wall 3 and is attracted to front wall 3 by electrostatic forces. The fastener assembly (members 7 and 8) are suitably longitudinally spaced at intervals along web 31. Preferably, the width of fastener assembly is less than one half the width of web 31 so as to enable seal 24 to be formed. It is appreciated that the speed within which web 31 is fed into apparatus 28 is increased due to the consummation of multiple sealing steps simultaneously, and the time required to form, fill and seal a respective bag 1 is decreased.

Figure 47:
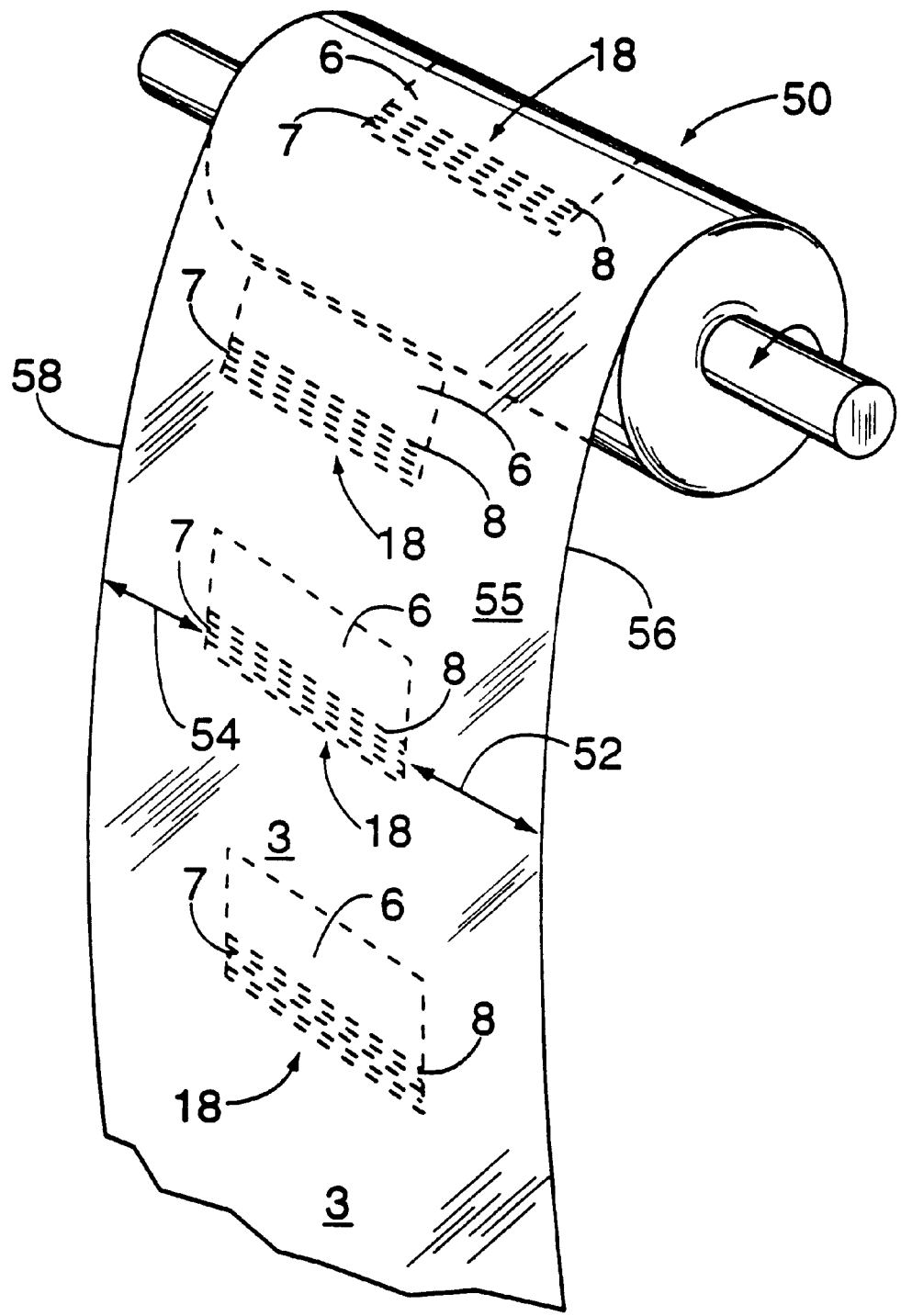
FIG. 47 is a perspective view of a roll of web of the present invention.

As illustrated in FIG. 47, web 50 includes a multiplicity of flexible interlocking fastener lips 6 which are free of connection to web 50. That is, lips 6 simply rest on each respective sheet 55 of web 50 at this juncture. Each lip 6 is permanently connected to a fastener assembly 18, is integral therewith, or optionally can be releasably attached thereto. Each fastener assembly 18 includes an engaging member releasably connected to a complimentary engaging member 8. Complimentary engaging member 8 is connected to front wall portion 3 of web 50. The web or bag film of the present invention is commonly referred to as plastic film and includes polymeric materials as are known in the art. It is appreciated that sealing or connecting only complimentary engaging member 8 to web 50 prior to formation of bag 1 or utilization of web 50 with apparatus 28 greatly simplifies and facilitates that manufacturing process. Sealing of lip 6 to front wall 3 during the formation of bag 1 provides numerous advantages in the manufacturing process including, by way of example, faster web feed times and the like.

Figure 48:
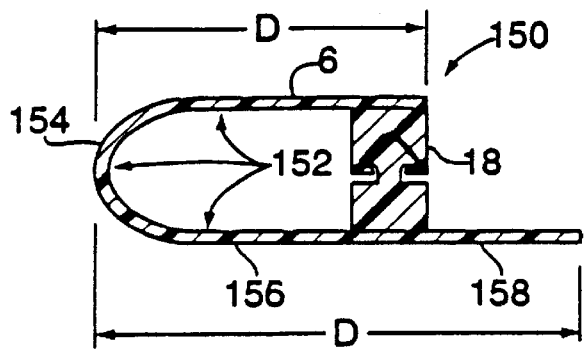
FIG. 48 is a side cross-sectional view of an optional recloseable flange of the present invention.
Figure 49:
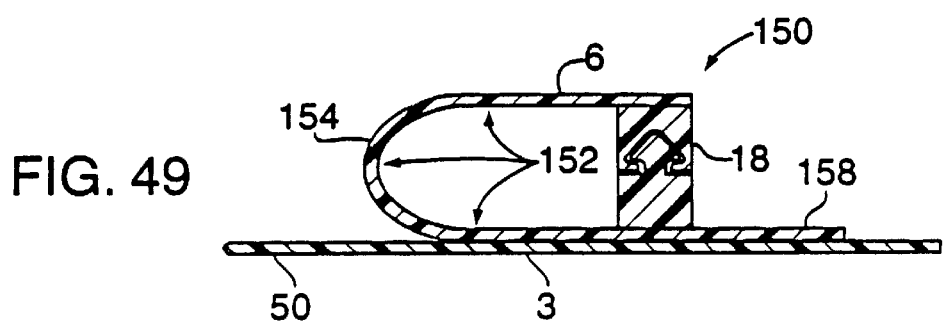
FIG. 49 is a partial side cross-sectional view of the recloseable flange of FIG. 48 connected to a web wall.
Figure 51:
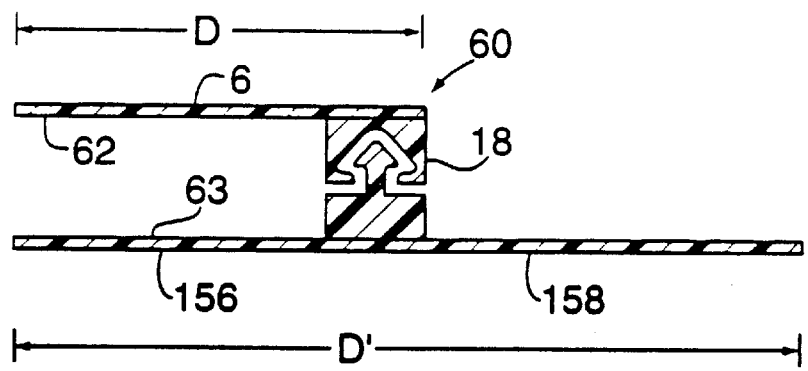
FIG. 51 is a side cross-sectional view of an optional recloseable tape of the present invention.

FIG. 48 is a side cross-sectional view of optional recloseable tape 150 used in bag 1. Tape 150 has inside loop surface 152 that is treated to be non-sealable. Many compositions are known in the art that can make a surface non-sealable. An exemplary such composition is lacquer. In this embodiment, lip 6 has bend 154 and opposite wall 156 and lower flange area 158. Both lower flange portion 158 and opposite wall 156 are sealed to front wall 3 of web 50 (FIG. 49). In a preferred embodiment, distance D is about ¾ inches long and distance D' is about 1¼ inches long. It is appreciated that distance D and distance D' can be varied as required for the type of bag 1 manufactured (FIGS. 48 and 51). Preferably, lip 6, bend 154, opposite wall 156, and lower flange area 158 are formed from one piece of plastic material.

Figure 50:
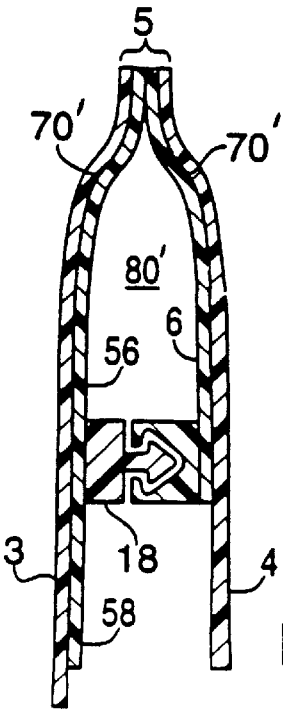
FIG. 50 is a partial side cross-sectional view of an optional recloseable tape of FIG. 51 in an assembled bag of the present invention.
Figure 53:
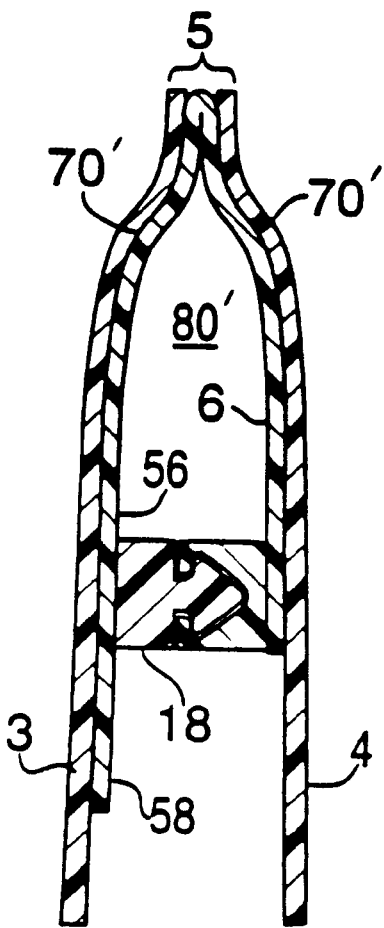
FIG. 53 is a partial side cross-sectional view of the recloseable flange of FIG. 48 in an assembled bag of the present invention.

It is appreciated that fastener or zipper 18 is completely sealed in the inside storage volume of bag 1 as illustrated in FIGS. 50 and 53. In this embodiment, bag 1 is free of tear tabs with perforations or tear strips. Rather, a perforation 7 or other indicia is printed across bag 1, below or just below, top seal 5. Bag 1 is opened along perforation 70' with scissors or other suitable cutting utensil, and used as a normal recloseable bag 1 upon severance of bag 1 along the perforation.

Figure 57:
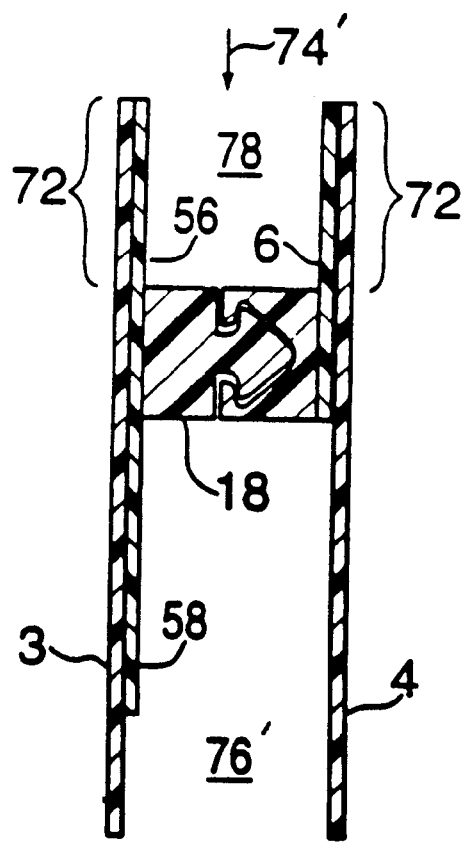

It is appreciated that bi-laminate upper gripping portions 72 created by sealing front wall 3 to lower flange area 158 and opposite wall 156, and lip 6 to back wall 4 greatly extends the life of the gripping portion 72 even after multiple continued openings and closings of fastener 18, and provides a reinforced base upon which both portions of fastener 18 are mounted. It is further appreciated that bi-laminate upper gripping portions 72 are more rigid than either walls 3, 4, lip 6, or opposite wall 156 alone, and facilitate the direct vertical insertion of products back into bag 1 through mouth 78 as indicated by arrow 74' after severance of bag 1 along line 72 and opening of fastener 18 (FIG. 57). Bag 1 provides for a bag 1 having varying degrees of flexibility. These varying degrees of flexibility include more flexibility at front wall portion 3' below lower flange 158 and at back wall 4 below fastener 18 relative to the upper portion of bag 1 that includes the various tape 150 or flange 60 sealed thereto. This feature allows the storage volume 76' to readily adapt to the size and shape of products contained therein while simultaneously providing less flexible upper gripping portions 72 that facilitate alignment of the fastener 18 elements one with another, and closure thereof. The arrangement of the elements of the invention as described herein eliminates the risk of outside contamination during the time of storage of bag 1 or during store display due to the fail-safe recloseable features described herein. Only, when top seal 5 is cut off bag 1 does the recloseable fastener 18 reclosably seal off the bag contents in the bag storage volume without the protection of top seal 5. Upper temporary storage volume 80' (FIGS. 50 and 53) optionally retains advertising literature and coupons as described above.

Figure 52:
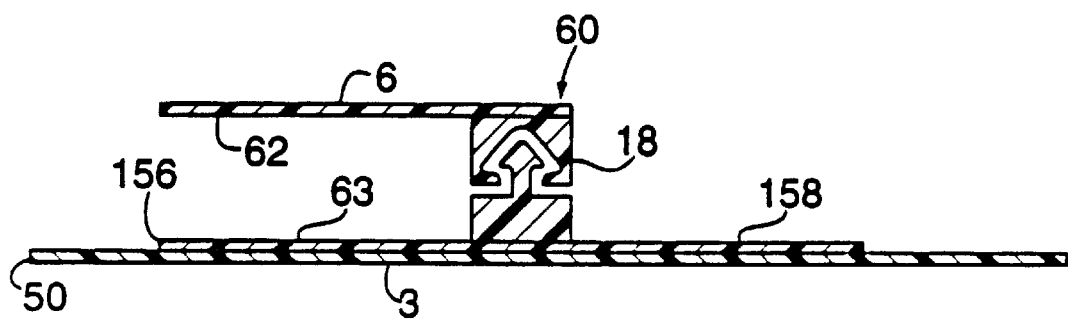
FIG. 52 is a partial side cross-sectional view of the recloseable tape of FIG. 51 connected to a web wall.

FIG. 52 is a partial side cross-sectional view of lower flange portion 158 and opposite wall 156 of recloseable flange 60 sealed to a front web wall 3 of web 50. In this variant high flange portions 62, 63 are treated to be non-sealable. It is further appreciated that tape 150 and flange 60 can be constructed of materials that are about 3 mils in thickness or less. It is appreciated that the bi-laminte for upper gripping portions 72 allows for materials of decreased thickness to be used while still retaining the desired properties of bag 1. Web 50 is constructed of materials of standard thickness as used in the construction of disposable bags.

Figure 54:
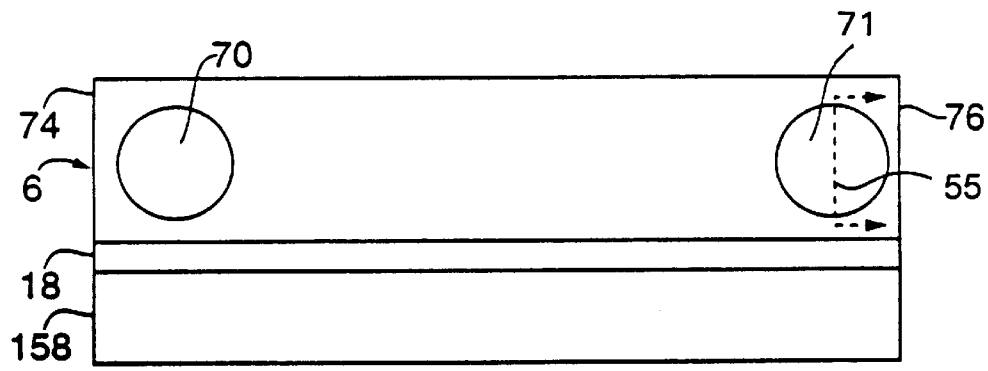
FIG. 54 is a side view of a variant of the flange of FIG. 48.
Figure 55:
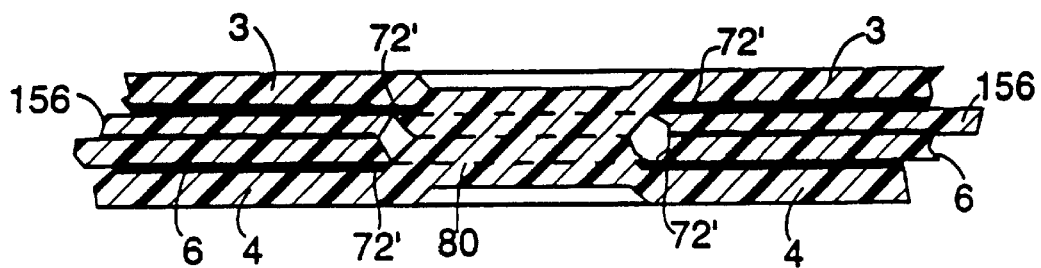
FIG. 55 is a side cross sectional view of the flange of FIG. 54 in an assembled bag of the invention.

FIG. 55 is a side cross sectional view of the tape of FIG. 54 in an assembled bag 1. Phantom line 55' of FIG. 54 indicates the location of the cross sectional view of FIG. 55. Walls 3 and 4 are fusibly sealed one to another at fused seal 80 through apertures 70, 71 disposed near ends 74, 76. Fused seal 80 is juxtaposed around the periphery 72' of aperture 71.

Figure 56:
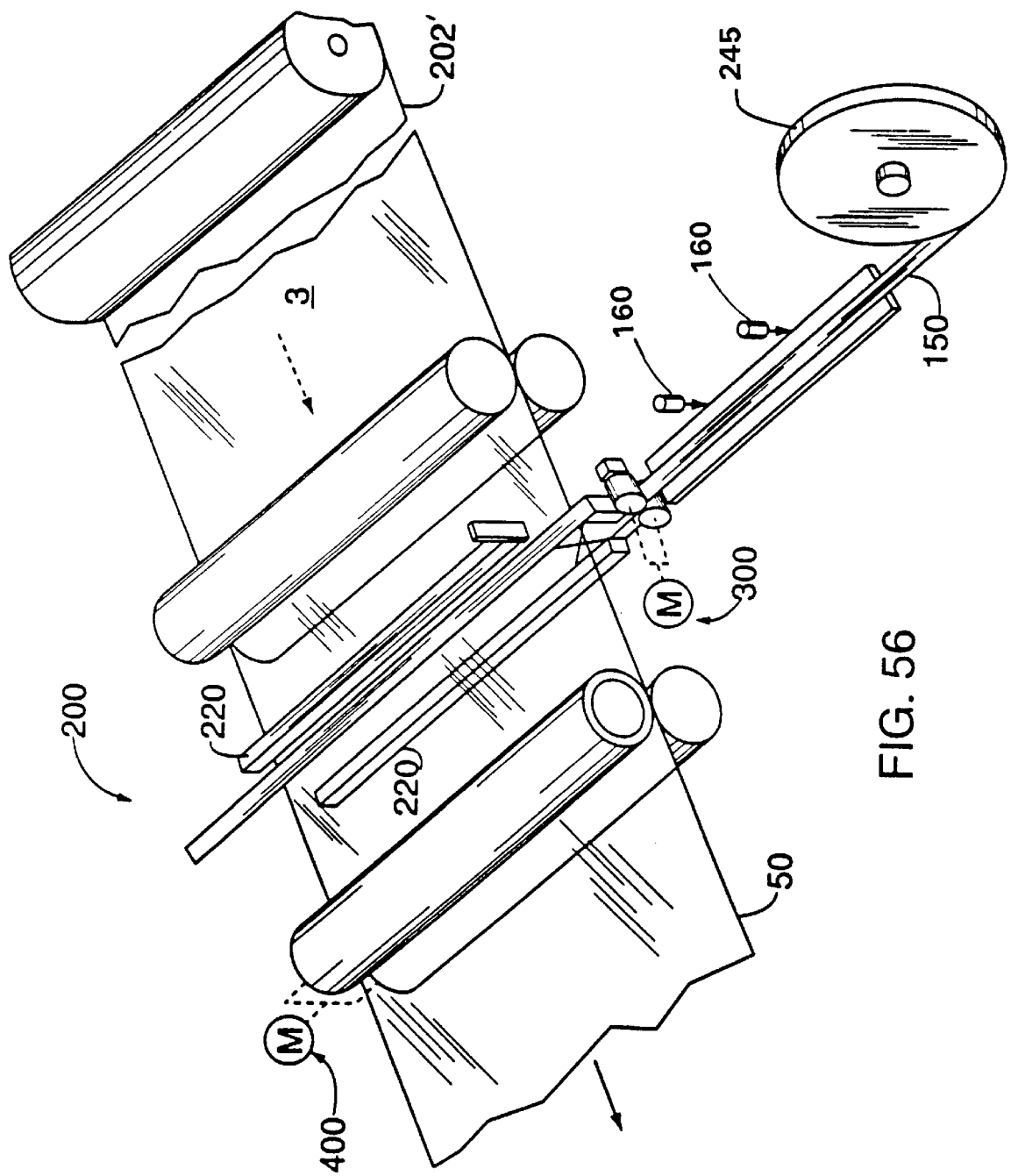
FIG. 56 is a perspective view of an apparatus to manufacture web material that is used with the vertical bag forming, filling and sealing apparatus of FIG. 46; and, FIG. 57 is a side cross sectional view of the bag of FIG. 53 upon severance of the top portion thereof.

Apparatus (not shown) is provided to make recloseable tape 150 or flange material 60 and wind tape 150 or flange 60 into rolls 245 (FIG. 56). The apparatus is located upstream of apparatus 28 and apparatus 200. Apparatus 200 unwinds a roll of tape 150 or flange 60, indexes as appropriate (advancing and indexing device 300), and optionally punches holes 70, 71 with hole punching device 160 near opposite ends 74, 76 of lip 6. Preferably holes 74, 76 are in the range of about ⅜ of an inch to about ½ of an inch in diameter (FIG. 54) and are equidistant from ends 74, 76 respectively. Holes 70, 71 are made of a desired size and geometric shape, e.g. circular, oval, square, rectanguler, etc., depending upon the type of fusible seal 80 that is desired to be created (FIG. 55).

As illustrated in FIG. 56, apparatus 200 indexes again to a location centered above the backside of the intended front panel 3 of the basic web material 202' (cross web) and tape 150 or flange 60 is cut to a length that is less than the width of front panel 3 of bag 1. Concurrent with the unwinding step described above, base web 202' is fed or indexed to a position that allows registration of zipper strip 18 (cross web) to just below the intended top of the finished bag 1 (advancing and indexing device 400). Lower flange area 158 and ends 74, 76 of lip 6, fold 154 and opposite wall 156 adjacent to the inside surface of front panel 3 are substantially sealed to the inside surface of front panel 3 (seal bars 220). As discussed above, the prepared web 50 is then fed to apparatus 28 as described above. Apparatus 28, in addition to making the normal cross sealing and cutting operations, utilizes sealing bars that are modified and of a size and shape to seal the opposite side of the loop or flange area.

While only a few, preferred embodiments of the invention have been described hereinabove, those of ordinary skill in the art will recognize that the embodiment may be modified and altered without departing from the central spirit and scope of the invention. Thus, the preferred embodiment described hereinabove is to be considered in all respects as illustrative and not restrictive, the scope of the invention being indicated by the appended claims, rather than by the foregoing description, and all changes which come within the meaning and range of equivalency of the claims are intended to be embraced herein.

What is claimed:

1. A snack bag comprising:
    a reclosable tape secured to the inside surfaces of opposing bag walls;
    said reclosable tape having a reclosable interlocked fastener connected to said tape;
    said tape having a loop having a fold;
    said loop having an inside loop surface;
    said reclosable interlocked fastener being connected to the inside surface of said loop;
    said inside loop surface being non-sealable; and
    further comprising a thin sealant layer disposed above said reclosable tape on the inside surfaces of said opposing bag walls to provide for ease of opening said snack bag.

* * * * *

US006152601C1

(12) EX PARTE REEXAMINATION CERTIFICATE (9183rd)
United States Patent
Johnson

(10) Number: US 6,152,601 C1
(45) Certificate Issued: Aug. 14, 2012

(54) FASTENER TAPE MATERIAL BAG UTILIZING FASTENER TAPE MATERIAL, AND METHOD OF MANUFACTURING THEREOF

(75) Inventor: James R. Johnson, Chamblee, GA (US)

(73) Assignee: Illinois Tool Works Inc., Glenview, IL (US)

Reexamination Request:
No. 90/011,408, Dec. 30, 2010

Reexamination Certificate for:
Patent No.: 6,152,601
Issued: Nov. 28, 2000
Appl. No.: 09/133,615
Filed: Aug. 13, 1998

Related U.S. Application Data

(62) Division of application No. 08/899,434, filed on Jul. 24, 1997.
(60) Provisional application No. 60/035,051, filed on Jan. 22, 1997, provisional application No. 60/036,186, filed on Jan. 18, 1997, and provisional application No. 60/022,353, filed on Jul. 24, 1996.

(51) Int. Cl.
B65D 33/00 (2006.01)

(52) U.S. Cl. .................. 383/210; 383/63; 383/210.1
(58) Field of Classification Search .................. 383/210, 383/210.1, 63
See application file for complete search history.

(56) References Cited

To view the complete listing of prior art documents cited during the proceeding for Reexamination Control Number 90/011,408, please refer to the USPTO's public Patent Application Information Retrieval (PAIR) system under the Display References tab.

Primary Examiner — Matthew C. Graham

(57) ABSTRACT

Methods, an apparatus and a system in which reclosable bags and components thereof are formed are disclosed. The reclosable bags 2001 are made from base web material that has transversely applied fastener tape segments thereon. The web material is used in a vertical form, fill and seal bag forming method. The method includes the steps of supplying a continuous strip of tape, having male and female fasteners profiler across the web for sealing thereon. In one embodiment a continuous strip of barrier material, and a continuous strip of fastener having first and second interlocked fastener profile strips are positioned on the continuous strip of tape; and secured thereon, the barrier tape is folded to obtain a fold and two opposing barrier tape fastener strip connecting portions; and, the fold is slit to form two separate continuous strips of barrier material strips and two continuous strips of tape. In another embodiment a coating is applied to the tape itself to prevent sealing of the folded slit tape to itself. The resulting tape and fastener are cut 220 and portioned properly on the web by the unique vacuum belt system of the present invention and by the interconnected tape drive, web drive and the connection to the form fill seal machine.

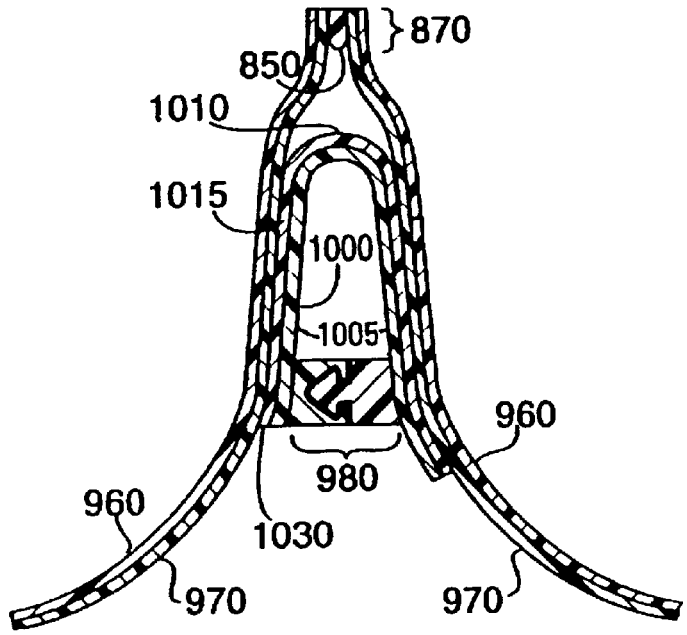

EX PARTE REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claim 1 is confirmed.

* * * * *